(12) United States Patent
Ben Meir et al.

(10) Patent No.: US 9,568,143 B2
(45) Date of Patent: Feb. 14, 2017

(54) TRIPOD WITH FAST OPENING AND CLOSING MECHANISM AND METHODS OF USE

(71) Applicant: Ilan Ben Meir, Ra'anana (IL)

(72) Inventors: Ilan Ben Meir, Ra'anana (IL); Yitzhak Liechtenstein, Zichron Ya'acov (IL)

( * ) Notice: Subject to any disclaimer, the term of this patent is extended or adjusted under 35 U.S.C. 154(b) by 0 days.

(21) Appl. No.: 15/033,130

(22) PCT Filed: Sep. 15, 2014

(86) PCT No.: PCT/IL2014/050821
§ 371 (c)(1),
(2) Date: Apr. 29, 2016

(87) PCT Pub. No.: WO2015/063754
PCT Pub. Date: May 7, 2015

(65) Prior Publication Data
US 2016/0258572 A1    Sep. 8, 2016

Related U.S. Application Data

(60) Provisional application No. 61/897,292, filed on Oct. 30, 2013.

(51) Int. Cl.
*F16M 11/34* (2006.01)
*G03B 17/56* (2006.01)
*F16M 11/16* (2006.01)

(52) U.S. Cl.
CPC .............. *F16M 11/34* (2013.01); *F16M 11/16* (2013.01); *G03B 17/561* (2013.01); *F16M 2200/028* (2013.01)

(58) Field of Classification Search
None
See application file for complete search history.

(56) References Cited

U.S. PATENT DOCUMENTS

| 2,794,612 A * | 6/1957 | Leyman | ................. F16M 11/28 108/1 |
| 4,324,477 A | 4/1982 | Miyazaki | |

(Continued)

OTHER PUBLICATIONS

International Search Report of Jan. 21, 2015 for PCT/IL2014/050821.

*Primary Examiner* — WB Perkey
(74) *Attorney, Agent, or Firm* — Maxwell L. Minch; GrayRobinson, P.A.

(57) ABSTRACT

The invention is directed to novel tripod having a fast opening and positioning mechanism configured to allow a user to open said tripod in a photographing location while maintaining eye contact with an object to be photographed, said tripod comprising legs having telescopic segments and a central locking mechanism operated by a handle having a trigger connected to a loaded spring positioned on a central column, wherein upon pressing on said trigger said central locking mechanism is unlocked to allow spacing of said tripod legs and free fall of said telescopic segments of each one of said legs towards the ground according to the height of the ground in the vicinity of each of said legs, and wherein upon sliding of said handle downward along said central column, said legs with said extended segments become locked in an open form.

19 Claims, 22 Drawing Sheets

(56) References Cited

U.S. PATENT DOCUMENTS

| | | | |
|---|---|---|---|
| 7,111,424 B1* | 9/2006 | Moody | F41A 23/08 |
| | | | 248/171 |
| 8,534,620 B2 | 9/2013 | Zierer et al. | |
| 2001/0010764 A1* | 8/2001 | Sherwin | F16M 11/26 |
| | | | 396/428 |
| 2007/0075209 A1* | 4/2007 | Kapp | A47B 97/04 |
| | | | 248/460 |
| 2008/0048074 A1* | 2/2008 | May | F16M 11/32 |
| | | | 248/176.1 |
| 2008/0078914 A1* | 4/2008 | Liao | F16M 11/32 |
| | | | 248/435 |
| 2008/0135694 A1* | 6/2008 | Boyce | B60R 11/02 |
| | | | 248/124.1 |
| 2010/0019109 A1* | 1/2010 | Liu | F16M 11/34 |
| | | | 248/168 |
| 2010/0282926 A1 | 11/2010 | Shen | |
| 2012/0018597 A1* | 1/2012 | Cyr | F16G 11/14 |
| | | | 248/165 |

* cited by examiner

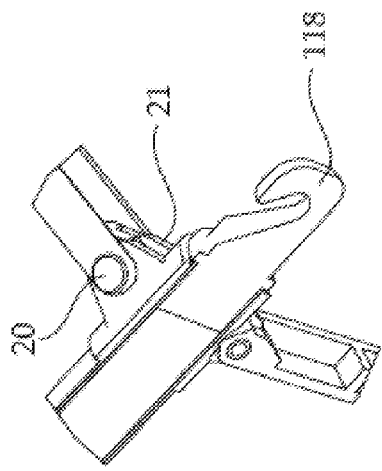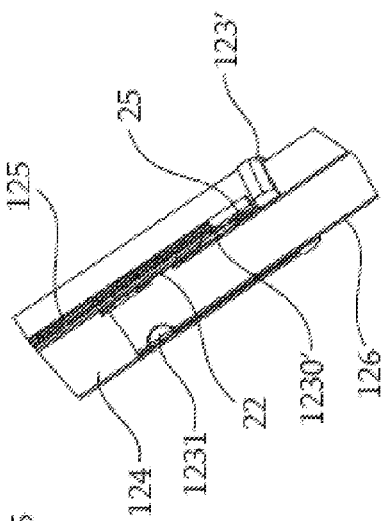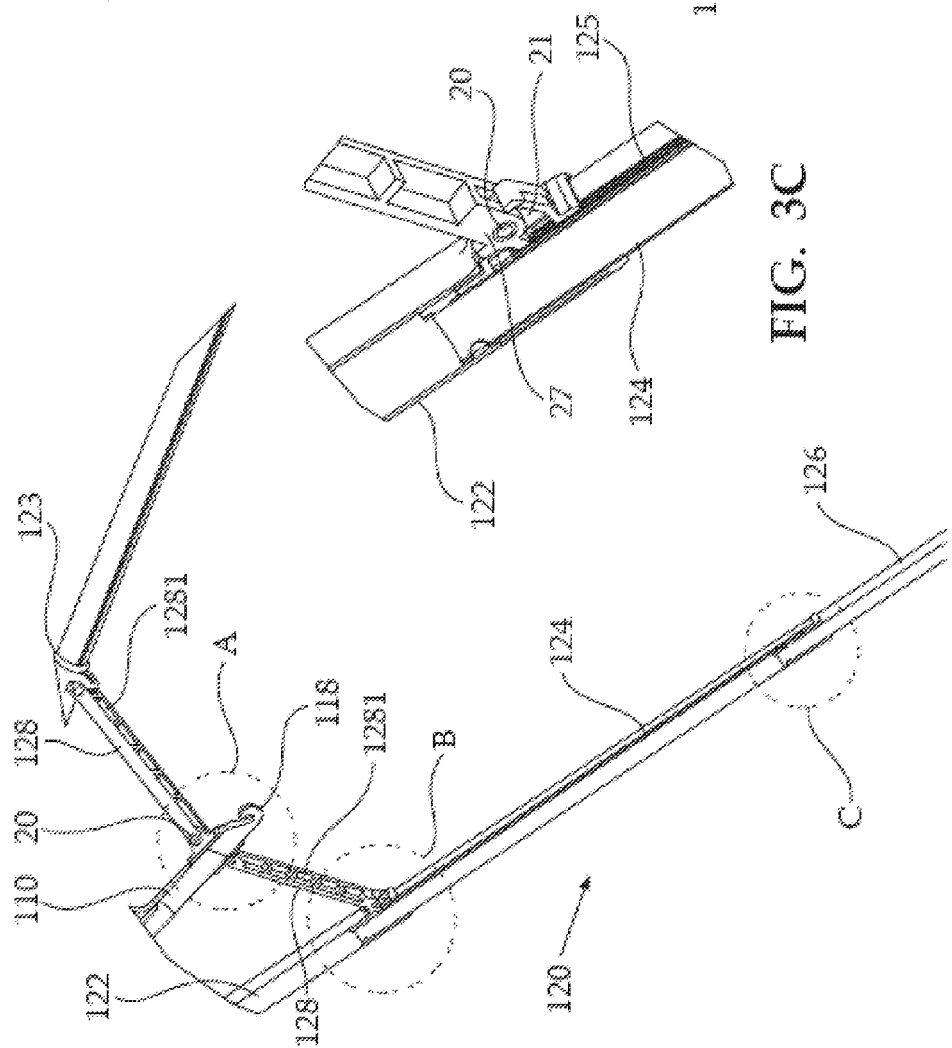

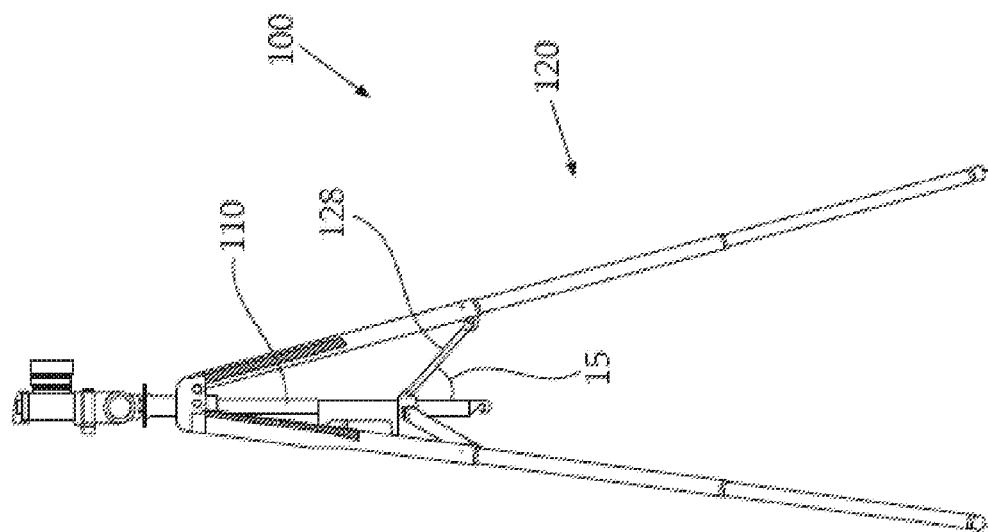
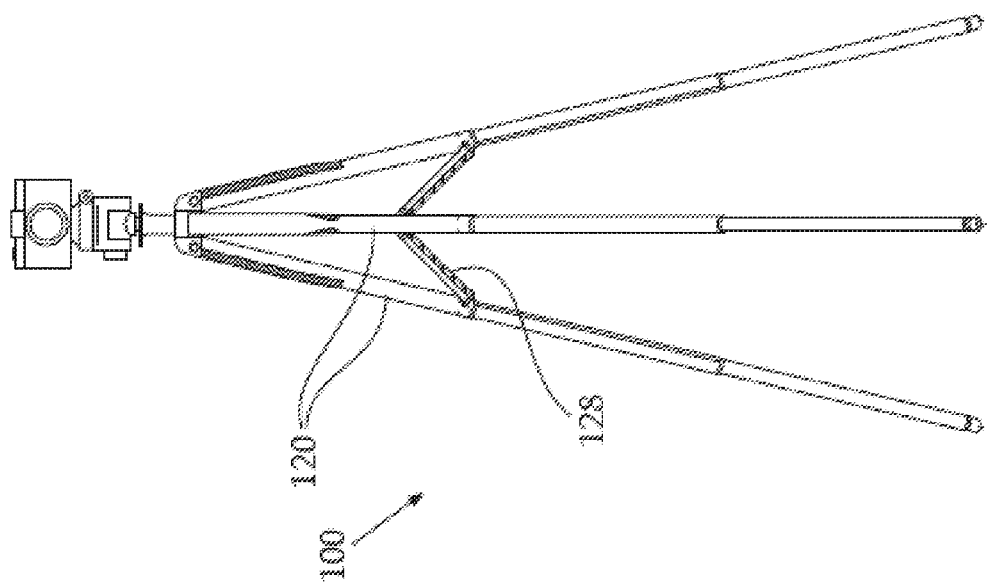

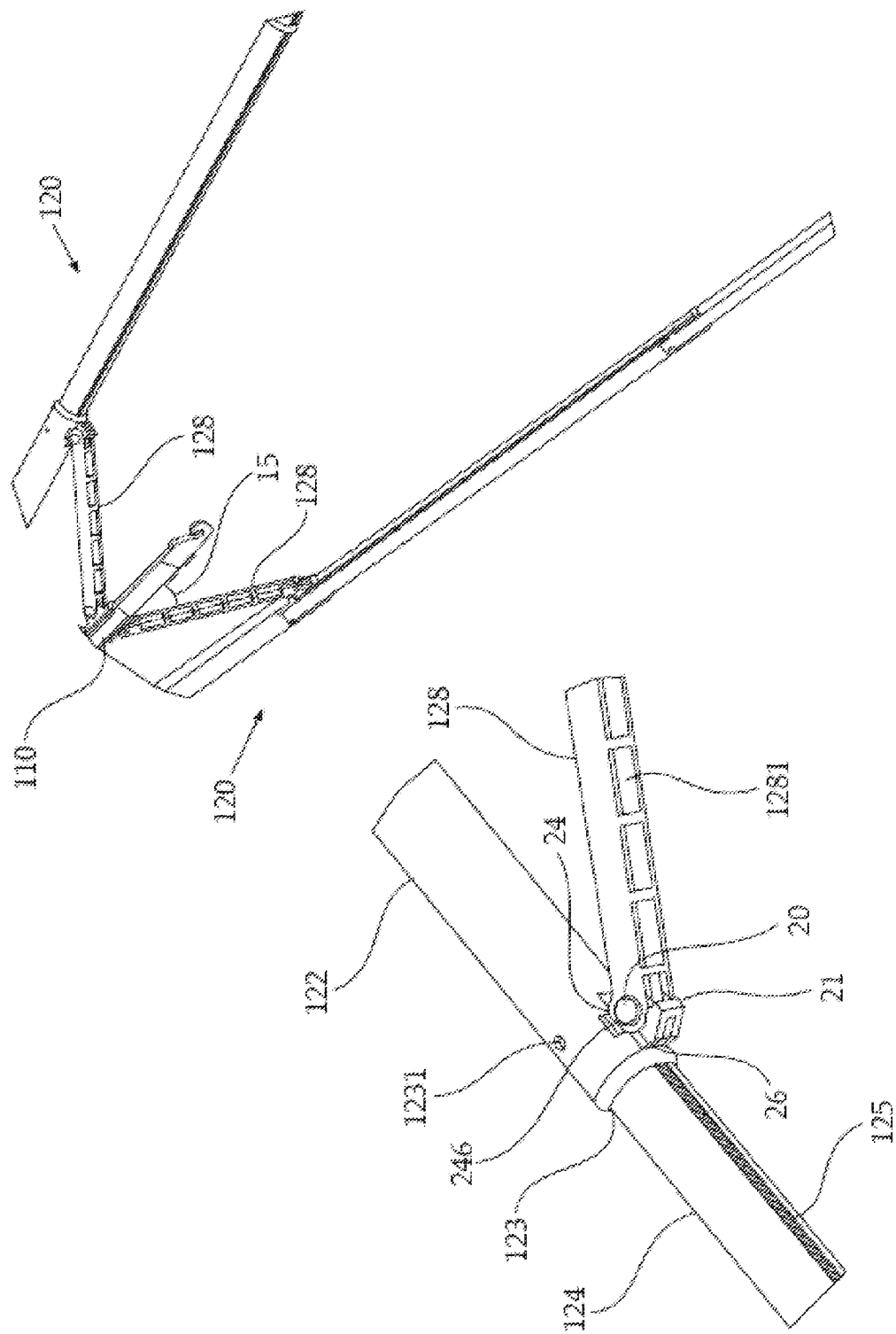

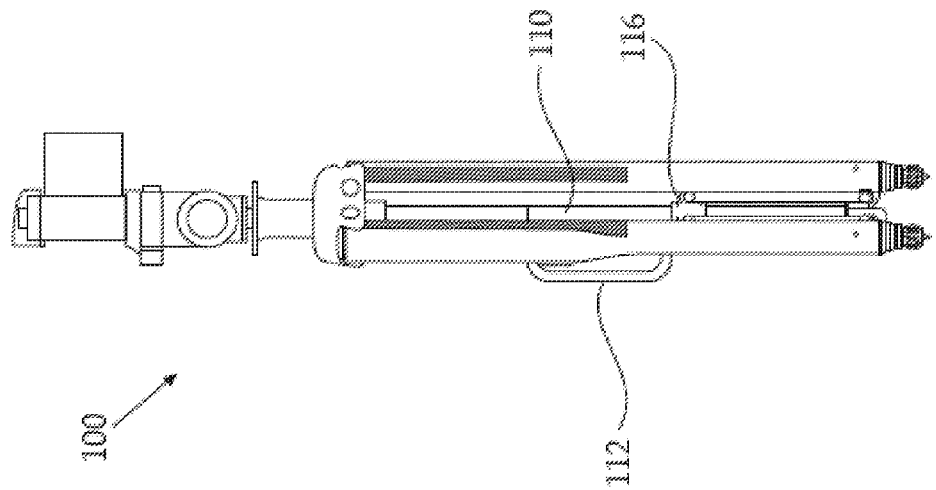
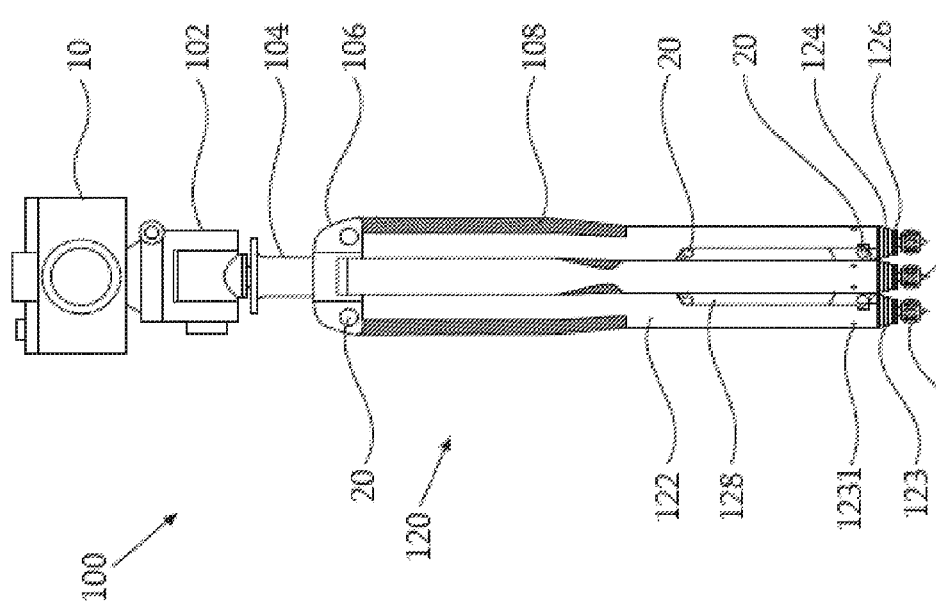
FIG. 6A
FIG. 6B

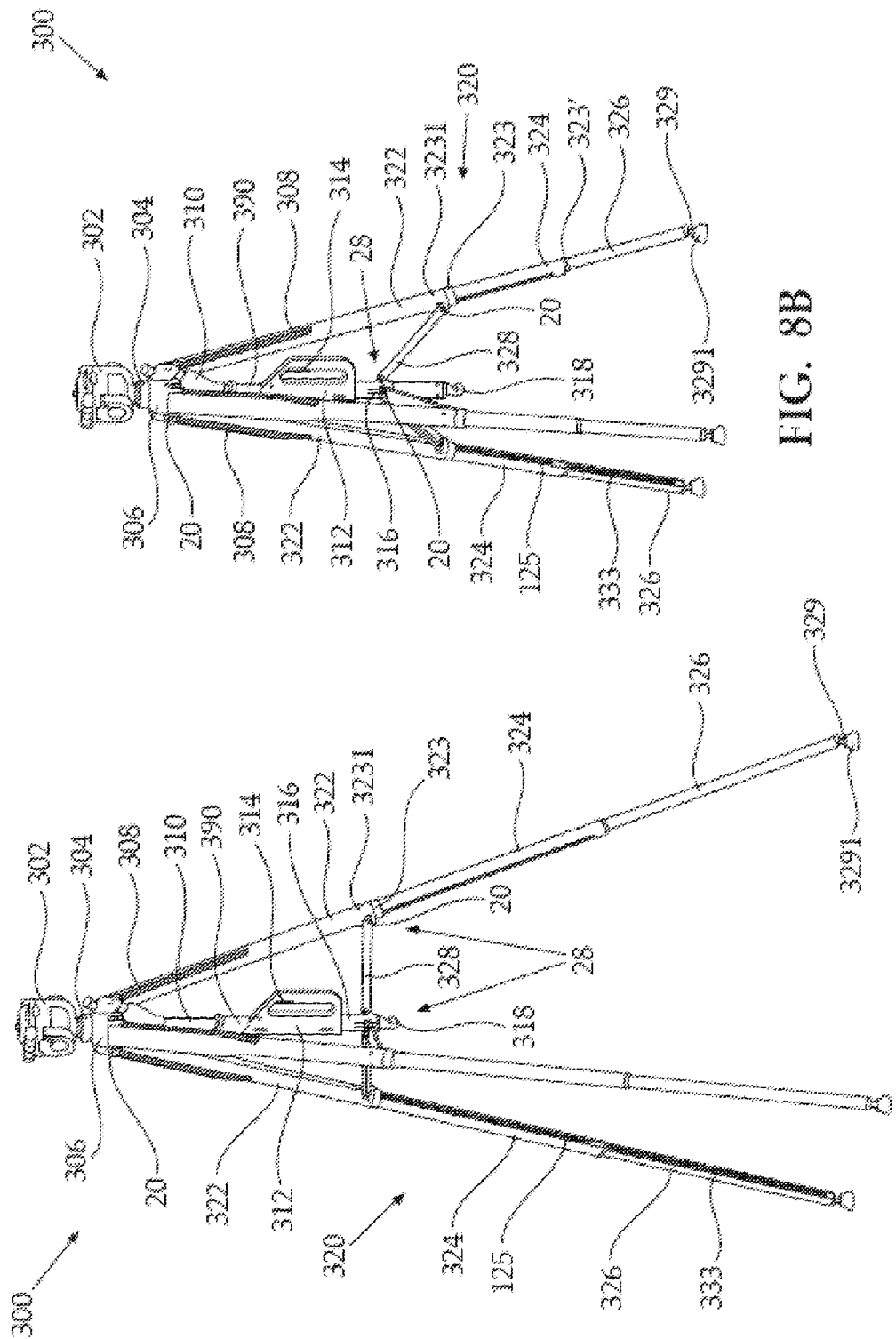

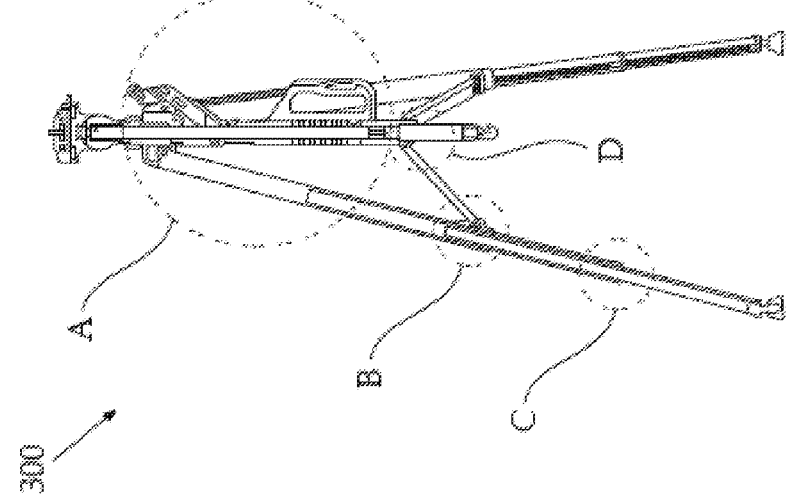
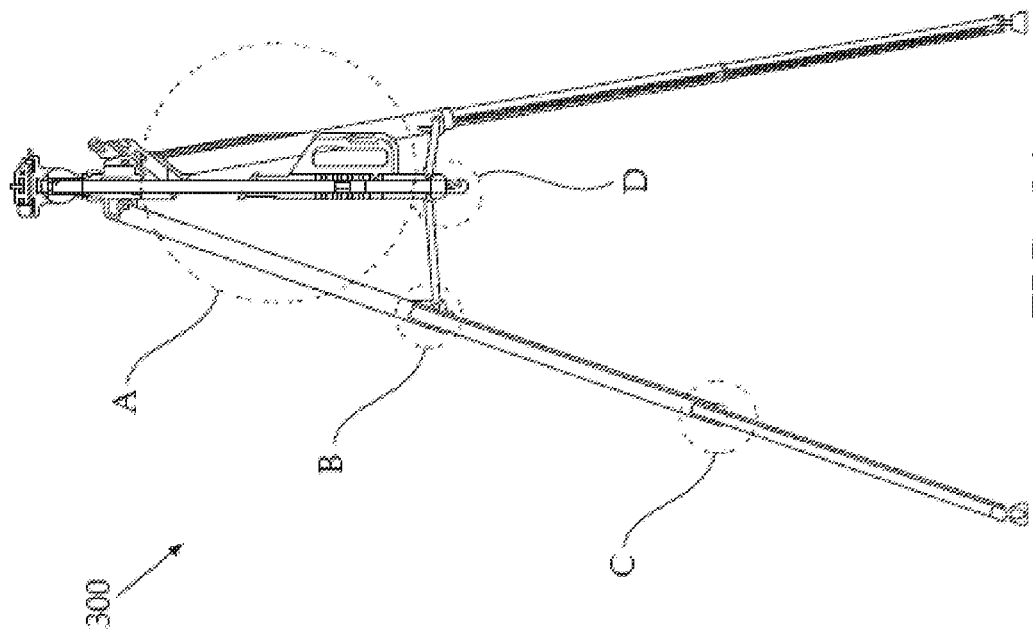

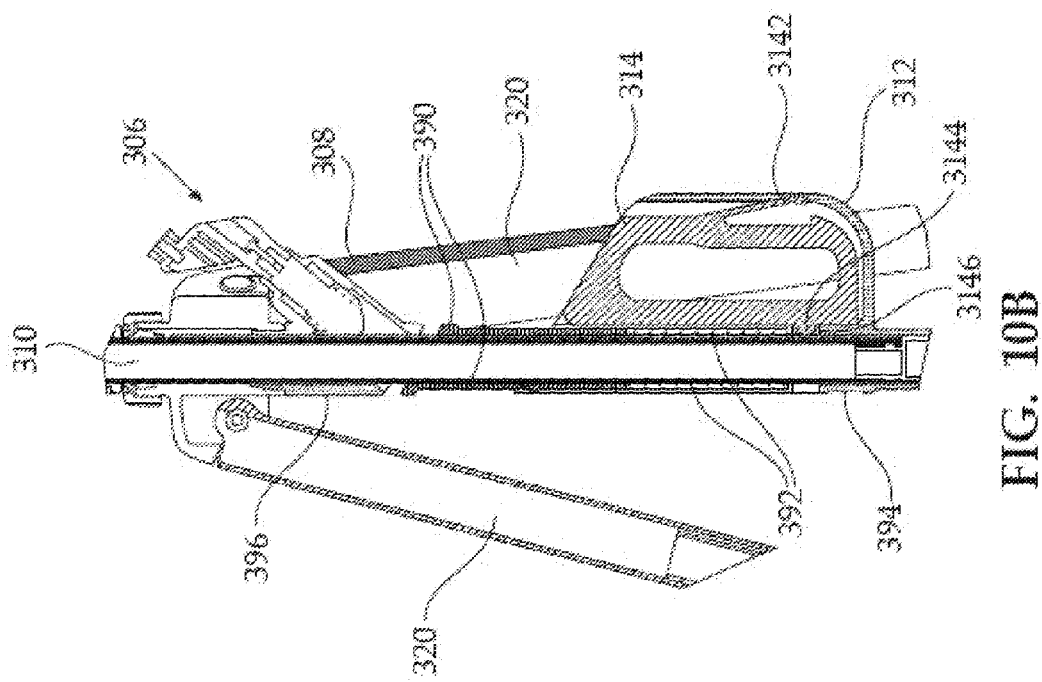
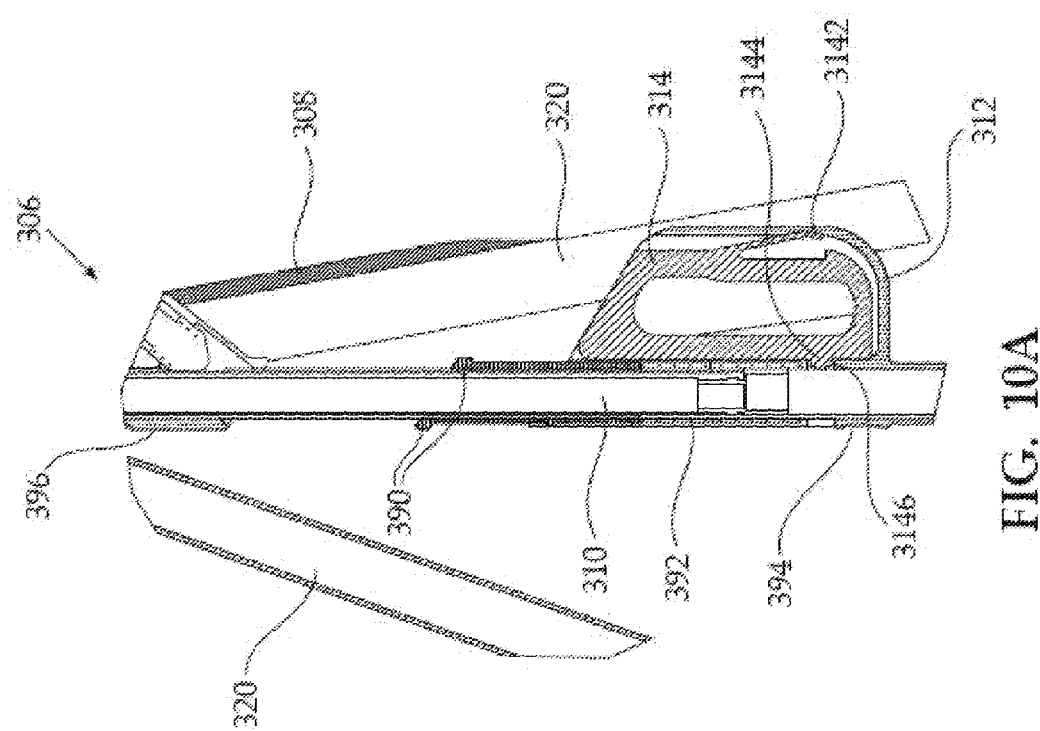
FIG. 10A
FIG. 10B

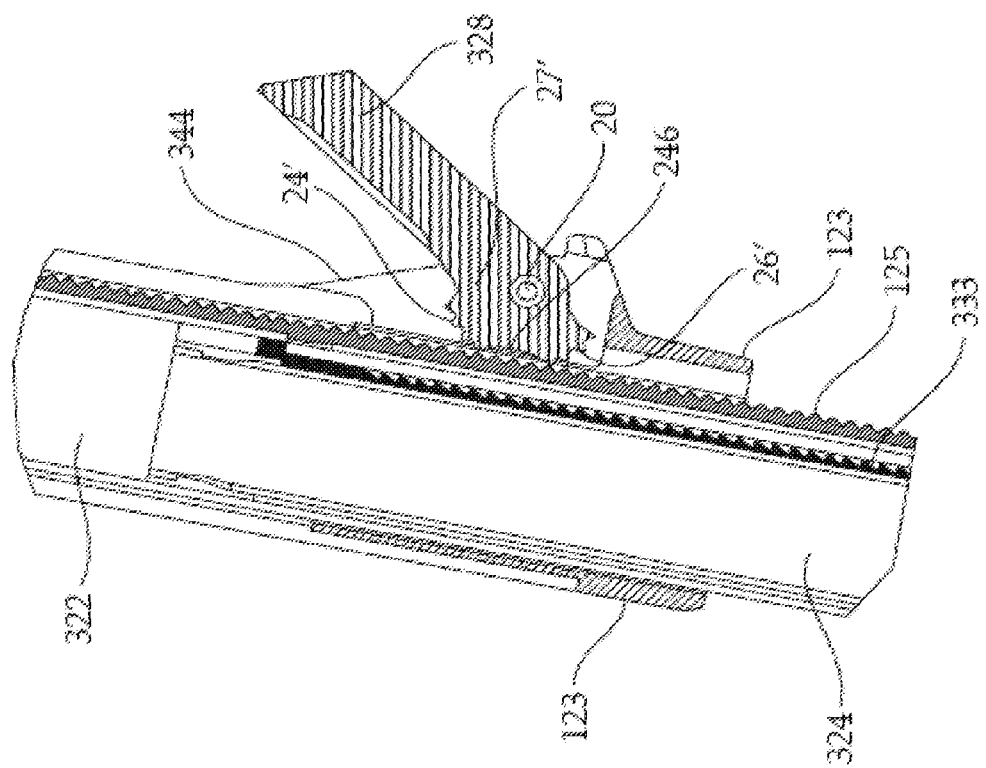
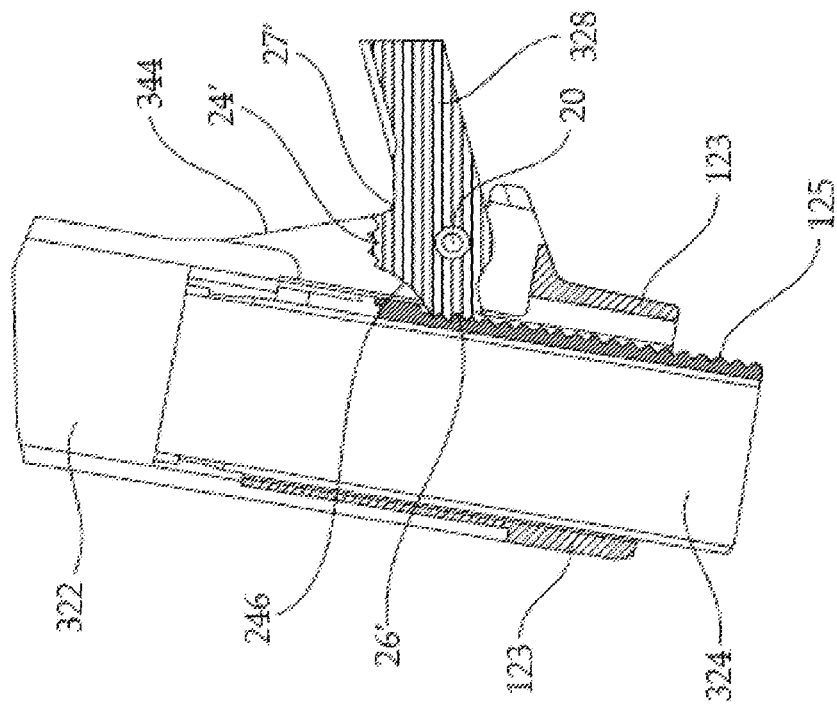

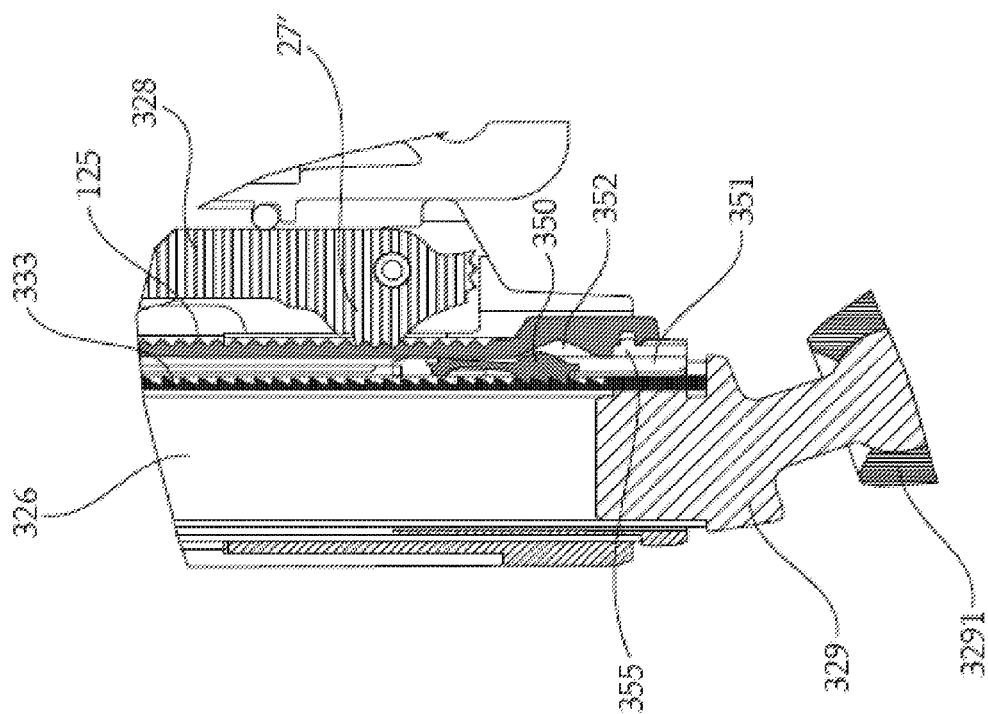
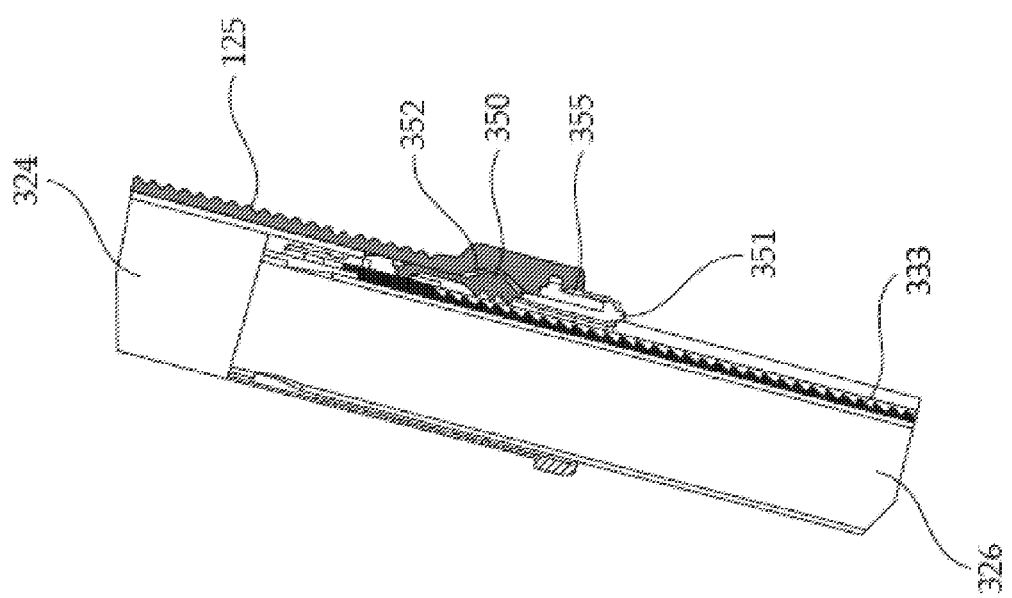
FIG. 12C
FIG. 12B

TRIPOD WITH FAST OPENING AND CLOSING MECHANISM AND METHODS OF USE

TECHNOLOGICAL FIELD AND BACKGROUND

The present invention is in the field of photography equipment. More specifically the invention relates to tripods having a novel central mechanism for opening/closing the tripod and extending/retracting the leg segments that provides a user with a fast, simple and convenient way to open and deploy the tripod upon photographing, repositioning the tripod in the photography site, and packaging the tripod after the work is completed.

Tripod supports for photographic and other equipment are well known. Many variations have been developed to address issues of stability, weight, adjustability, reliability, cost, and ease of use. Trade-offs involving these factors have been made in the past. However, there is much room for innovation as these trade-offs have reached diminishing returns.

Most development in recent years has focused on providing tripods with enhanced stability and reliable operation. Little has been done to improve the ease of use that is cumbersome and occupies the photographer's attention instead of allowing him/her to focus on the shots he/she should take. The time required for opening/closing and positioning the tripod is sometimes crucial when photographing a real-time event with no repeat options.

Currently, most tripods known in the art are opened and deployed at the photography site manually i.e., the user has to open each leg of the tripod separately and unlock/lock each leg segment separately, and adjust the length of the tripod to the surface structure that it is positioned on.

Some attempts were made in the art to allow for a less cumbersome process of opening/closing of tripods. Some examples of such attempts are disclosed in the following patents and patent applications: JP2006170424 (A), WO2012030391, WO9920933, U.S. Pat. No. 6,793,191, U.S. Pat. No. 7,086,631, and CN201731245.

Thus, it is obvious that a mechanism, capable of simplifying the opening/closing and deploying of a tripod is desired. The present invention is aimed at providing such a mechanism.

SUMMARY OF THE INVENTION

The subject matter described herein is directed to a novel tripod with innovative features that provides the user with a simple, fast and friendly way of operating a tripod.

In the following description, the terms: "opening/closing mechanism", "locking/unlocking mechanism", and "locking/releasing mechanism" are used interchangeably and all are utilized to describe the mechanism that is used to transform the tripod from a closed, retracted form to an open, extended form and vice versa.

In accordance with some aspects of the invention, the tripod is configured to be opened in a fast, one step process that simultaneously releases the three tripod legs from a close mode in which the legs are parallel or almost parallel to a central column (0-10 degrees between the legs and the central column), to an open mode in which the legs are deployed in an angle of about 15-60 degrees relative to the central column. The opening process further releases retracted telescopic segments located in each leg (two segments or more) so as to allow each segment to be extracted, i.e. to slide freely within the telescope to a desired height from the ground, according to the surface curvature in the vicinity of each leg of the tripod (i.e., upon holding the tripod head or the camera attached to it above the ground with the legs turning downwards, each leg is extended according to the surface curvature in its vicinity regardless of the flatness of the surface. For example, when the tripod is opened on stairs, slope, rock, or within a hole in the ground, each one of the legs will be extended according to the surface that it is positioned on, and the length of each one of the legs in an open extended mode may differ from the length of the other two legs that may also differ from one another, all according to the surface curvature/contours that the tripod is positioned on.

When the legs are opened and the segments of each leg are extended, a central locking mechanism allows simultaneous locking of at least three (3) locking sub-mechanisms and optionally, simultaneous locking of another three (3) to six (6) locking mechanisms as will be described hereinafter with reference to FIGS. 1-6. This central opening/closing and locking mechanism eliminates the need to open each leg separately, unlock each segment, pull it out to a desired length, and finally to relock each of the segments in a desired height, to open and deploy the tripod, and to perform a similar set of actions in an opposite order for closing the tripod after use. This operation mode allows the photographer to view the target to be photographed from the camera location and to fix the tripod as soon as he/she finds the desired position for taking the shots, without a need to change any position or to remove his/her eyes from the target.

In accordance with further aspects of the invention, the novel tripod comprises a semi-automated opening/closing mechanism. In order to open the tripod and extend the segments of each leg, the user first presses on a trigger within an opening/closing handle. Upon pressing the trigger, the legs of the tripod become spaced to an angle, in which the segments of each leg are unlocked and extended automatically (drop downward toward the ground). To fix the tripod in a desired position, the user then moves the handle upward (to close the tripod) or downward (to open the tripod).

In accordance with one another aspect of the invention, the novel tripod comprises a central locking/unlocking mechanism, preferably positioned within the tripod base, and upon opening one leg, the other legs become opened automatically.

The novel tripod provided herein further allows the user to connect a camera to the tripod in two modes: a close mode and an open mode. The camera may be attached to the tripod of the invention in a close mode, in which it remains connected thereto during the opening and locking process. Alternatively, the camera may be attached to the tripod of the invention after it has been opened.

Although the description provided herein refers to a tripod with straight legs, it should be clear to any man skilled in the art that the present invention may similarly be implemented with curved legs and with concave legs to thereby enhance the stability of the tripod.

BRIEF DESCRIPTION OF THE DRAWINGS

Examples illustrative of variations of the disclosure are described below with reference to figures attached hereto. In the figures, identical structures, elements or parts that appear in more than one figure are generally labeled with the same numeral in all the figures in which they appear. Dimensions of components and features shown in the figures are generally chosen for convenience and clarity of presentation and are not necessarily shown to scale. The figures presented are in the form of schematic illustrations and, as such, certain elements may be drawn greatly simplified or not-to-scale, for illustrative clarity. The figures are not intended to be production drawings. The figures (Figs.) are listed below.

FIGS. 3A-3E are schematic partial cross section and close up views of the opening/closing mechanism of the tripod illustrated in FIG. 1 in three different locations of the tripod, wherein FIG. 3A is a cross section view showing three major areas: area "A" describing the locking mechanism between a central column and two out of three connecting arms (illustrated in a close up view in FIG. 3B); area "B" illustrating the locking mechanism between a connecting arm and the leg attached thereto (illustrated in a close up view in FIG. 3C); and area "C" describing the locking mechanism in the connection area between the second and the third segments of one leg (illustrated in close up views in FIGS. 3D-3E).

FIGS. 5A-5E are schematic illustrations of the tripod of FIG. 1 in a partially open mode and with fully extended legs, wherein FIGS. 5A and 5B are front view and side view illustrations respectively; FIGS. 5C and 5E are close up views of the connection area between the second and third segments of a leg with the relative locking arm; and FIG. 5D is a partial cross section view of the tripod legs, the connecting arms, and the central column with the opening/closing mechanism.

FIGS. 6A-6C are schematic front view, side view and isometric view illustrations (respectively) of the tripod of FIG. 1 in a fully close mode with the legs diminished to their minimal length.

FIGS. 8A-8C are schematic front view illustrations of another example of a tripod 300 with a fast semi-automated locking/unlocking mechanism, wherein FIG. 8A illustrates tripod 300 in a fully open state with extended legs; FIG. 8B illustrates tripod 300 in a partially open mode with partially extended legs; and FIG. 8C illustrates tripod 300 in a close mode with legs diminished to their minimal length.

FIGS. 9A-9C are cross section views of tripod 300 in the three modes illustrated in FIGS. 8A-8C respectively, wherein each cross section shows four major areas: area "A" describing the central column area and the locking/unlocking mechanism operating in this area; area "B" describing the junction area between a connecting arm and the first and second segments of the leg and the locking/unlocking mechanism operating in this area; area "C" describing the connection area between the second and the third segments of the leg and the locking/unlocking mechanism operating in this area; and area "D" describing the junction area between the central column and the connecting arms of tripod 300 and the locking/unlocking mechanism operating in this area.

FIGS. 10A-10C are schematic close up views of area "A" illustrated in FIG. 9 describing the central column of tripod 300 with major components of the locking/unlocking mechanism, including a trigger and a piston connected to a loaded/unloaded spring, in a fully open mode (FIG. 10A), partially open mode (FIG. 10B), and fully close mode (FIG. 10C) of tripod 300 respectively.

FIGS. 11A-11C are schematic close up views of area "B" illustrated in FIG. 9 describing the junction area between a connecting arm and the first and second segments of leg 320 of tripod 300 with major components of the locking/unlocking mechanism in a fully open mode (FIG. 11A), partially open mode (FIG. 11B), and fully closed mode (FIG. 11C) respectively.

FIG. 12A-12C are schematic close up views of area "C" illustrated in FIG. 9 describing the connection area between the second and the third segments of 320 leg of tripod 300 with major components of the locking/unlocking mechanism, in a fully open mode (FIG. 12A), partially open mode (FIG. 12B), and fully close mode (FIG. 12C) respectively.

FIG. 14A-14B are schematic isometric view and cross section view along axis AB respectively, of the junction area between the connecting arm and the first and second segments of the legs of tripod 100 of FIG. 1 or tripod 300 of FIG. 8, having a double fixed tooth line structure and a break pad configuration to provide enhanced stability to the tripod of the invention in an open extended position, wherein FIG. 14A is an isometric view; and FIG. 14B is a cross section view along axis AB illustrated in FIG. 14A.

DETAILED DESCRIPTION OF THE EMBODIMENTS

Figure 1A:
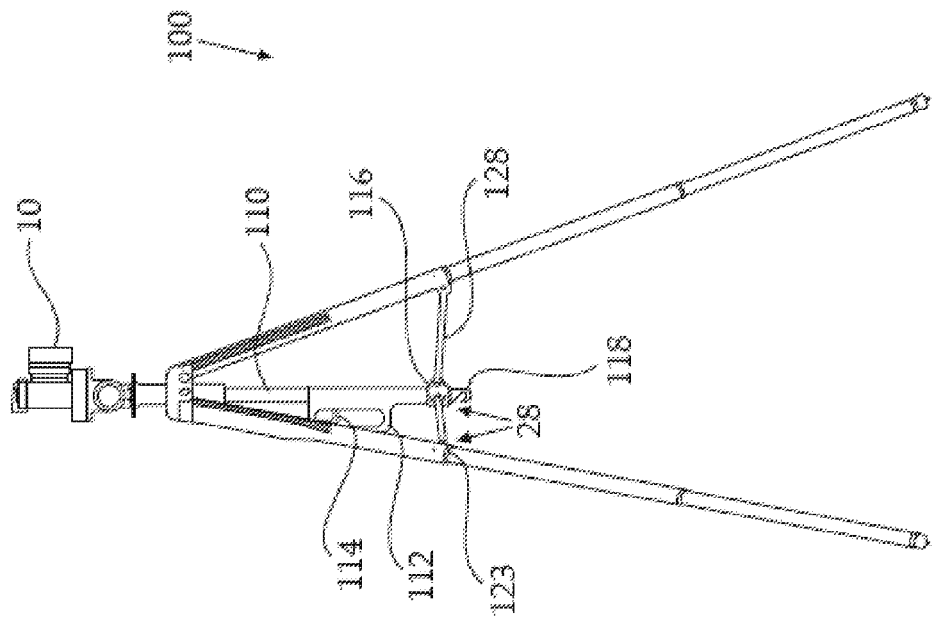
FIGS. 1A and 1B are schematic front view and side view illustrations of one example of a tripod with a fast opening/closing mechanism in a fully open mode and fully extended legs.

Although various features of the disclosure may be described in the context of a single embodiment, the features may also be provided separately or in any suitable combination. Conversely, although the disclosure may be described herein in the context of separate embodiments for clarity, the disclosure may also be implemented in a single embodiment. Furthermore, it should be understood that the disclosure can be carried out or practiced in various ways, and that the disclosure can be implemented in embodiments other than the exemplary ones described herein below. The descriptions, examples and materials presented in the description, as well as in the claims, should not be construed as limiting, but rather as illustrative.

In one aspect of the invention a tripod having a fast opening and positioning mechanism is provided. The tripod is configured to allow a user to open the tripod in a photographing location while maintaining eye contact/full visibility with an object to be photographed, said tripod comprising legs having telescopic segments and a central locking mechanism operated by a handle having a trigger connected to a loaded spring positioned on a central column, wherein upon pressing on said trigger said central locking mechanism is unlocked to allow spacing of the tripod legs and free fall of the telescopic segments of each one of the legs towards the ground according to the height of the ground in the vicinity of each of the legs, and wherein upon sliding of said handle downward along the central column, said legs with the extended segments become locked in an open form.

In some aspects of the invention, the legs of the tripod comprise at least two telescopic segments configured to be extracted and retracted upon opening and closing of said tripod so as to allow adjustment of said tripod's height according to an object to be photographed; the central column is connected to each of said tripod legs via a corresponding connecting arm, each connecting arm is configured to allow locking of the tripod in an open and close form as part of the central locking and unlocking mechanism; and the central locking and unlocking mechanism is configured to allow a user to transform the tripod to any one of the following forms: tripod locked with close legs and fully retracted telescopic segments; tripod locked with close legs and partially retracted telescopic segments; tripod unlocked with partially open legs and partially extracted telescopic segments; tripod locked with fully open legs and partially extracted telescopic legs; and tripod locked with a fully open legs and fully extracted telescopic legs.

In accordance with some aspects of the invention the angle and height of the legs of the tripod are determined by the handle positioned on the central column, and the position of the handle along the central column functionally determines whether the tripod legs and the central locking mechanism are in a locked or unlocked state.

In further aspects of the invention, a tripod having a fast opening/closing mechanism allowing a user to transform the tripod from a close folded form to an open extracted form and vice versa and further to lock said tripod in a desired height and angle in a photographing location is provided, the tripod comprising:

(a) legs having at least two telescopic segments configured to be extracted and retracted upon opening and closing of the tripod so as to allow adjustment of the tripod's height according to an object to be photographed;

(b) a central column connected to each of said tripod legs via a corresponding connecting arm, wherein each connecting arm is configured to allow locking of the tripod in an open and close form as part of a central locking and unlocking mechanism; and (c) a central locking and unlocking mechanism configured to allow a user to transform the tripod to any one of the following forms: tripod locked with close legs and fully retracted telescopic segments; tripod locked with close legs and partially retracted telescopic segments; tripod unlocked with partially open legs and partially extracted telescopic segments; tripod locked with fully open legs and partially extracted telescopic legs; and tripod locked with a fully open legs and fully extracted telescopic legs.

The angle and height of the legs of the tripod may be determined by a handle positioned on said central column, and the position of the handle along said central column functionally determines whether the tripod legs and the central locking mechanism are in a locked or unlocked state.

The positioning of the tripod may be adjusted by pressing a trigger positioned on the handle so as to unlock the tripod and to permit moving of the handle back and forth along the central column and to relock the tripod at a desired form.

The unlocking of the tripod is accomplished by extracting a notch connected to the trigger from a dedicated opening on the central column; relocking of the tripod is accomplished by inserting the notch into another dedicated opening on the central column.

In some embodiments, the opening/closing of the tripod and locking of the tripod in a desired form may is achieved by performance of two steps.

In some variations of the invention, the fast opening/closing mechanism is a semi-automatic mechanism configured and operable to be actuated by a handle comprising a trigger and connected to a piston attached to a loaded spring. In such variation, in a close form of the tripod, upon pressing on the trigger, a notch connected to the trigger is released from an opening on the central column, and the loaded spring and piston connected thereto are released, thereby pushing the handle downward along the central column, so as to permit automatic opening of the telescopic legs to an angle relative to the central column that allows for unlocking and extension of said leg segments. Locking the tripod in the open extended form is accomplished by sliding the handle downward and pressing the trigger in order to lock the notch connected to the trigger into a lower opening on the central column. Alternatively, the notch connected to the trigger is automatically inserted into one of the openings on the central column upon sliding the handle downward or upward, and the user is required to press on the trigger only for releasing the notch from the opening.

In an open form of the tripod, upon pressing on the trigger, the notch connected to the trigger is released from the opening on the central column so as to permit gathering of the tripod legs toward the central column, thereby minimizing the opening angle of the legs relative to the central column to an angle that allows insertion of the legs segments one into the other. Upon reaching that angle, the segments are functionally inserted one into the other so as to permit minimizing the size of the tripod and locking the tripod in a close retracted form.

The insertion of the segments one into the other may be accomplished by one of the following methods: (i) by pressing the segments toward the ground; (ii) by turning the tripod upside down for using gravity force for insertion of the segments one into the other. Completion of the locking is accomplished by pulling the handle upward and inserting of the notch connected to the trigger into the uppermost opening in the central column, so as to allow loading of the spring connected to the piston in a state ready for re-opening of the tripod.

The subject matter provided herein is further directed to a method for fast opening and positioning of a tripod by a user in a photographing location, the tripod comprising legs having telescopic segments and a central locking mechanism operated by a handle having a trigger connected to a loaded spring, the method comprising: (a) pressing the trigger so as to unlock the central locking mechanism to allow spacing of the tripod legs to an angle allowing free fall of the telescoping segments of each of the legs to the ground, according to the height of the ground in the vicinity of each of said legs; (b) sliding the handle downward with respect to a central column, thereby relocking the legs and extended segments in the open form obtained in step (a).

The method allows the user to maintain eye contact with an object to be photographed while opening and positioning said tripod.

The method according to the above may be implemented when the tripod comprises at least the following: (a.) legs having at least two telescopic segments configured to be extracted and retracted upon opening and closing of the tripod so as to allow adjustment of the height of the tripod according to an object to be photographed; (b) a central column connected to each of the tripod legs via a corresponding connecting arm; each connecting arm is configured to allow locking of the tripod in an open and close form as part of a central locking and unlocking mechanism; and (c) a central locking and unlocking mechanism configured to allow the user to transform the tripod to any one of the following forms: tripod locked with close legs and fully retracted telescopic segments; tripod locked with close legs and partially retracted telescopic segments; tripod unlocked with partially open legs and partially extracted telescopic segments; tripod locked with fully open legs and partially extracted telescopic legs; and tripod locked with a fully open legs and fully extracted telescopic legs.

In accordance with examples of the method presented herein, for fast closing of the tripod from an open locked form the method further comprises the following steps: (d) pressing the trigger and sliding the handle upward along the central column to unlock the central locking mechanism and to allow gathering of the spaced legs to an angle allowing insertion of the telescoping segments of each said leg one into the other; (e) inserting the segments one into the other by one of the following: pressing the segments toward the ground or turning the tripod upside-down for using gravitational force for insertion of the segments one into the other; and (f) sliding the handle upward along the central column so as to relock the legs and retracted segments in the close retracted form.

The subject matter of the invention is also directed to a tripod comprising telescopic legs having at least two segments; and a central locking and unlocking mechanism. The central locking and unlocking mechanism is configured to allow unlocking and opening of the tripod in a fast process that releases all of the tripod legs from a closed form in which the legs are parallel or almost parallel to each other to an open form, in which the legs are deployed in an angle between 15-60 degrees relative to their position in a closed form. Upon opening of the telescopic legs, the segments of each leg are automatically extracted and locked in a desired height with respect to the ground, according to a specific surface height in the vicinity of each leg of the tripod. In such embodiments, the locking and unlocking mechanism is configured to allow locking and unlocking of the tripod telescopic legs and segments of each of said legs according to the angle of the tripod legs, in a manner that the tripod is transformed from a locked state in an open and in a closed position of the legs to an unlocked state in a partially open position of the legs.

The central locking and unlocking mechanism is configured to allow closing and folding of the tripod from an open extracted form to a closed retracted form by performance of two steps: (i) unlocking the central locking mechanism; and (ii) pressing the legs toward the ground so as to insert the segments of each leg into one another or by turning the tripod in an unlocked state upside down so as to allow insertion of the telescopic segment to each other by gravity force.

Upon closing of the legs and retraction of the segments of each leg a spring is tensed so as to allow re-opening of the legs for the next use.

The central locking and unlocking mechanism may also be positioned within the tripod base.

In some aspects of the invention, the tripod may further comprise a central column that is connected to the tripod legs via connecting arms adapted to connect each of the legs with the central column. The central locking and unlocking mechanism is configured to be operated by a handle positioned on the central column, and the positioning of the handle along the central column functionally determines whether the central locking mechanism is in a locked or unlocked state. The handle comprises a trigger that is configured to release the handle from a fixed location on the central column and to allow movement of the handle toward another location on the central column so as to be relocked. Said location on the central column may be an opening configured to allow insertion and extraction of a notch connected to the trigger in a manner such that insertion of the notch into an opening permits locking of the tripod and extraction of the notch from the opening permits unlocking of the tripod and free sliding of the handle along the central column.

In a state where the central locking mechanism is locked, the tripod is either in a fully open or in a fully closed form. In a state in which the central locking mechanism is unlocked, the tripod is in a partially open form, and the trigger is configured to allow transformation from a locked to an unlocked state.

Figure 1B:
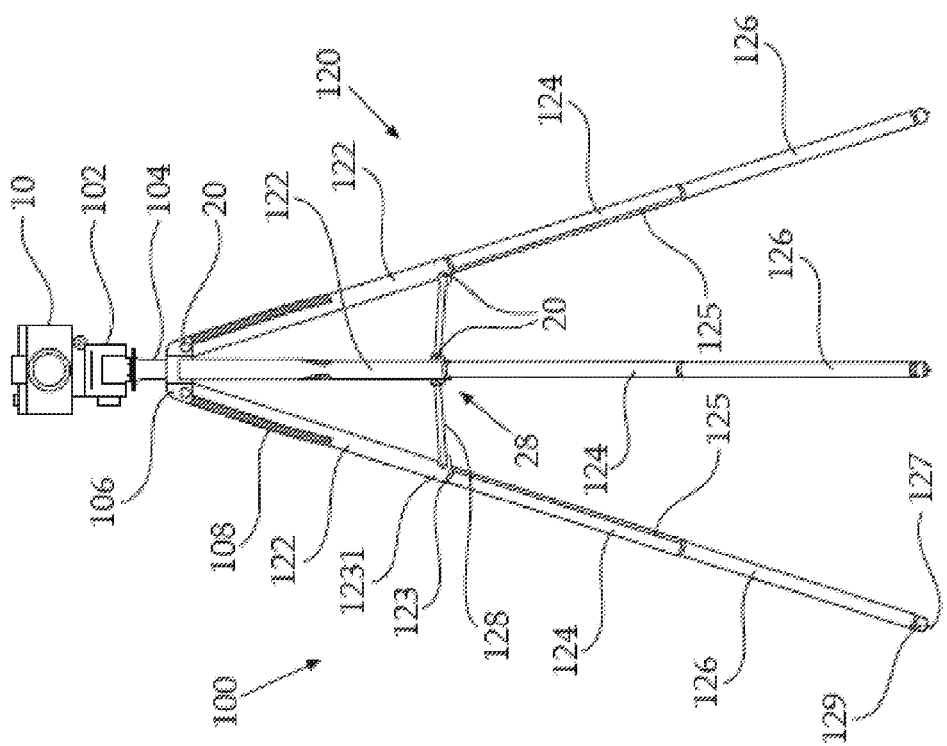

Reference is now made to FIGS. 1A and 1B that represent a schematic front view and side view illustrations of one example of a tripod with a fast opening/closing mechanism in a fully open mode and fully extended legs.

In the example illustrated in these figures tripod 100 comprises a head 102 that may be an integral part of the tripod or separated thereof, configured and operable to be attached to a camera 10, a base 106 connected by hinges 20 to three legs 120 and to a central column 110. Central column 110 is functionally connected to the base 106 in a manner that column 110 passes through base 106. Central column 110 is also connected to each one of legs 120 via arms 128. Arms 128 may be structured as one solid element. Alternatively arm 128 may comprise cavities 1281 for reducing the total weight of the tripod so as to make it easier to the photographer to carry the tripod with it.

In the example illustrated in FIG. 1 each one of legs 120 is a telescopic leg and is composed of three segments: an upper segment 122 ($1^{st}$ segment), a middle segment 124 ($2^{nd}$ segment), and a bottom segment 126 ($3^{rd}$ segment). Optionally, a fourth segment may be added to the tripod legs. The legs may be made of various materials such as, without limitation, metal, wood, plastic, and combinations thereof. In accordance with one preferred embodiment of the invention, the legs are made of plastic so as to provide the tripod a lighter weight that is important for the transportability character of the tripod.

In the specific variation of the invention illustrated in FIG. 1, each leg ends with a sharp foot 127 that provides the tripod with better ability to stand when the ground it is positioned on is made of sand, or other non-firm surface. In some embodiments of the invention, foot 127 may be covered by a spherical cover 129 that is preferably made of a rubber and configured to be rotated over foot 127 in order to avoid the sharp tip of the foot scratching or otherwise damaging a floor when it is positioned on a constructed surface.

Tripod 100 comprises a novel locking/unlocking mechanism that allows concurrent locking of the legs segments and the connecting arm with the legs and the central column by one locking action, and one unlocking action. The novel locking mechanism will be described in details with reference to FIGS. 2-3 below.

Upper segment 122 of leg 120 may include a gripping handle 108 that may be designed as an integral component of the segment or as an independent component. Gripping handle 108 is usually used to allow the user a convenient way to hold the tripod in general and in extreme weather conditions in particular (i.e. to avoid slipping of the tripod in hot weather as a result of sweating hand and to avoid cold burns in the hands in cold temperatures). Upper segment 122 is connected to tripod base 106 on its upper side and to second segment 124 on its lower side. The lower side of upper segment 122 comprises a bearing sleeve 123 at the connection area with middle segment 124 and a lock of the bearing 1231 (a close up view of the bearing sleeve and the lock are provided in FIG. 2). Optionally, a similar bearing sleeve and lock may be located in the lower side of middle segment 124 at the connection area with the third lower segment 126, in order to connect between the second segment and the third segment. In some embodiments of the invention the first segment may be made as a one unified unit having as integral parts all or some of the components mentioned in the above.

Middle segment 124 comprises a gear tooth line (cogs) 125 that is responsible for simultaneous locking of the second segment 124 of each one of legs 120 with third segment 126. Gear tooth line 125 is movable as it is positioned in a dedicated rail. In some embodiments, middle segment 124 may further comprise a solid gear tooth line incised on the segment profile, preferable in a horizontal plane to provide the tripod additional stability and ability to carry heavy cameras and other articles without crashing. In contrast to the first gear tooth line that has movement ability, this solid gear tooth line is fixed. Detailed description of such embodiment is described with reference to FIGS. 14A-14B.

In a scenario that the tripod legs comprise a forth segment (not shown), the third segment may also comprise a similar mechanism configured to allow locking of the third and the forth segments. Alternatively, the third and fourth segments may be locked and unlocked manually.

In some embodiments, the central column 110 is functionally connected to a carrying handle 112 having a trigger 114 that is used for opening and closing of tripod 100 and simultaneous release of legs segments 122, 124, and 126. Carrying handle 112 is also denoted hereinafter: "opening/closing handle". In the example illustrated in FIGS. 1-6, trigger 114 is connected to a central lock 116 that is further connected to the three connecting arms 128 that serve as hinging elements that connect the legs to the central column 110. The tip of the central column 110 may comprise a hook configure to allow hanging of a weight when additional stability of the tripod 100 is required.

Figure 2:
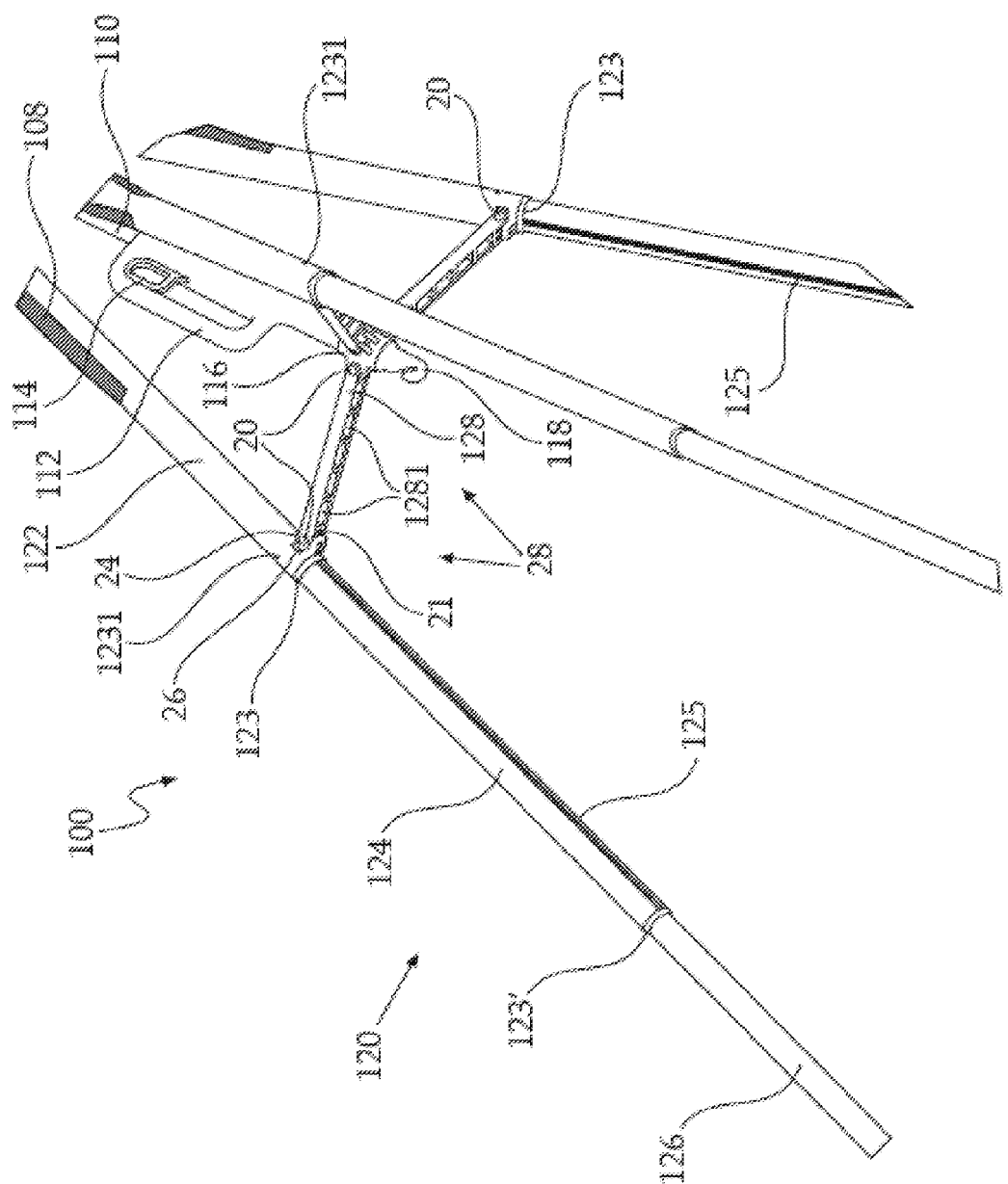
FIG. 2 is a partial isometric close up view of the opening/closing mechanism of the tripod illustrated in FIG. 1.

FIG. 2 is a partial isometric close up view of the opening/closing mechanism 28 of tripod 100 illustrated in FIG. 1. Shown in this view are legs 120 with first, second and thirds segments 122, 124, and 126 respectively, gripping handle 108, connecting arms 128 with cavities 1281, gear tooth line 125 of second segment 124, central column 110 together with carrying handle 112 and trigger 114, hook 118, central lock 116, hinges 20, hinge socket 21 of each leg, eccentric locking mechanism 28 with first lock part of eccentric 24 and second lock part of eccentric 26 providing two locking points in a fully open mode and in a fully closed mode of tripod 100. Also shown in this figure are bearing sleeve 123 and bearing sleeve lock 1231.

The opening of tripod 100 from a fully close mode with retracted legs to a fully open mode with extended legs is accomplished by pressing on trigger 114 and pushing handle 112 downwards. This movement pushes arms 128 from a parallel or almost parallel position relative to central column 110 to a vertical position. By pressing trigger 114 the eccentric locking mechanism 28 is released from its first locking point, and starts changing its position toward the second locking point (a close up view of the two locking points 24 and 26 is provided in FIG. 5E). Concurrently, the three telescopic legs 120 are released and the segments of each leg are extended to the maximal length that is possible, according to the surface curvature in the vicinity of each one of the legs. This unique feature frees the photographer from having to perform additional movements and adjustments of each leg length that is usually required when a tripod is positioned on a non-flat surface. When the eccentric locking mechanism reaches the second locking point the tripod is fully opened and locked. The mechanism described herein allows the photographer to open and lock the tripod in one simple action. In the specific example illustrated in FIG. 2, the novel tripod is configured to allow simultaneous operation of at least three (3) locking mechanisms positioned on the legs, and optionally, an additional three mechanisms positioned on the central column, by simply pressing on the trigger and pushing the opening/closing handle downward. To close the tripod, a similar action is required in the opposite direction, i.e. pressing on the trigger to release locking and pushing the opening/closing handle upward. This unique feature saves the photographer a lot of time and efforts that are usually required for opening and positioning tripods available in the market that require separate opening and locking of each leg and each one of the segments in each leg. When one takes into account the time required to open the tripod at the beginning of a photo session, unlocking each segment and relocking it to the desired position one or multiple times, and then closing the tripod at the end of the session, the tripod of the invention saves many steps and precious time, allowing for the photographer to focus on the photographic process itself and the object to be photographed, and not on preparing the equipment.

The locking of middle segment 124 and bottom segment 126 may also be achieved simultaneously or concurrently to the locking of legs 120 and connecting arms 128 with the locking of the central column 110, i.e., by performing one single act, nine locking mechanisms may be operated. This may be achieved, for example, by using locking mechanism 28 used for locking central column 110 and first and second legs segments 122, 124 to further move gear tooth line 125 positioned on second segment 124 to lock the third segments 126. A similar mechanism may be applied to lock a third and fourth segments (in tripods that comprise a forth segment). A more detailed description of this locking mechanism is provided with reference to FIG. 3 below.

Alternatively, the locking mechanism of the second and third segments (and the third and fourth segments if exist) may be accomplished manually by any standard locks suitable for this function and available in the market.

Figure 3E:
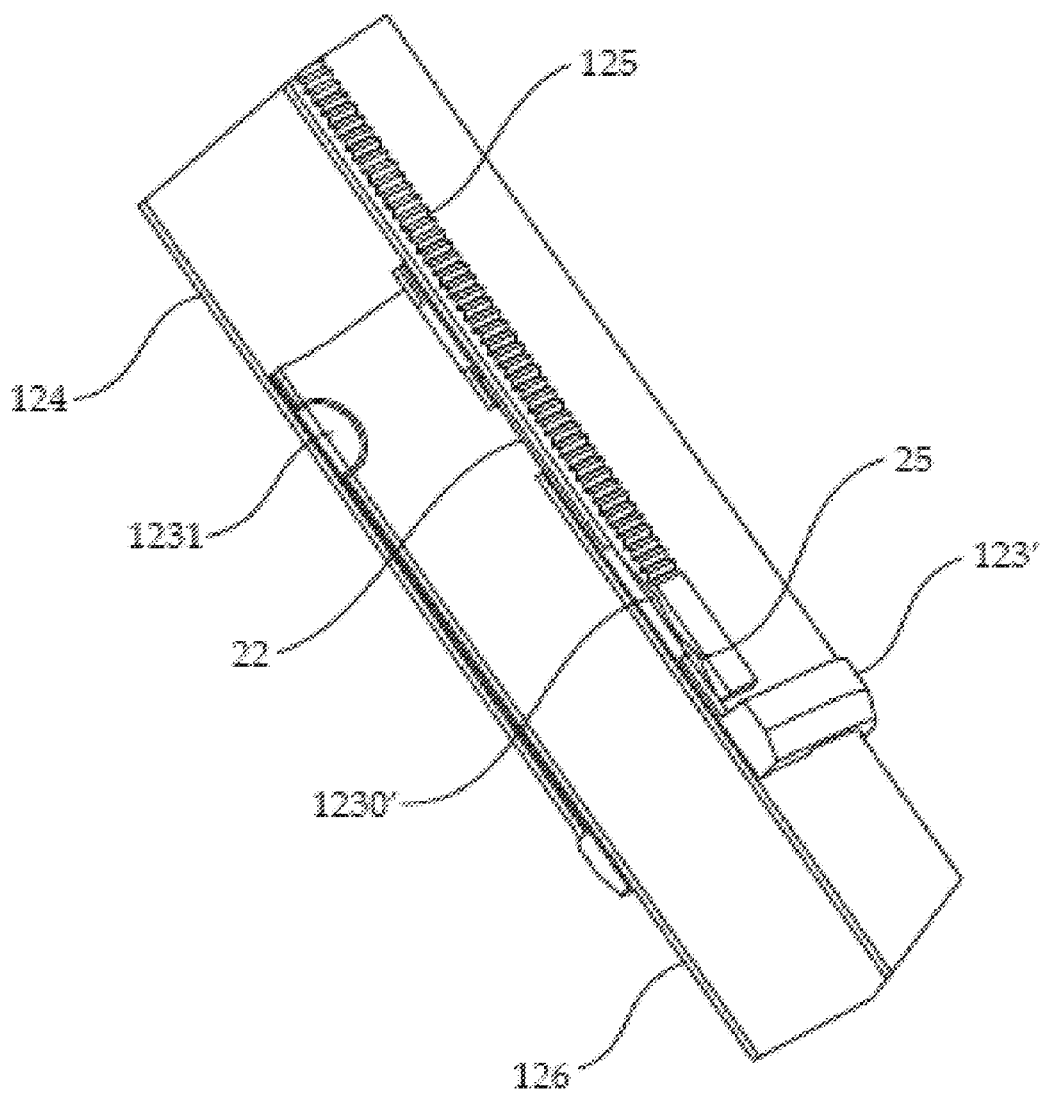

FIGS. 3A-3E are schematic partial cross section views of central column 110 and one of the legs 120 illustrating the opening/closing mechanism of the tripod illustrated in FIG. 1 in three junctions (connection points): area "A" describing the connection between central column 110 with arm 128 at the central lock region (FIG. 3B); area "B" describing the connection between connecting arm 128 and the corresponding leg connected to it (FIGS. 3C, 3E); and area "C" describing the connection between the second and the third segments 124, 126 of one leg (FIG. 3D).

In the example illustrated in these figures, the locking of the first segment 122 and the second segment 124 of each leg is performed by locking the central column 110 that simultaneously locks six (6) eccentric locking mechanisms: three positioned on central column 110 and function to lock central column 110 and the three arms 128; an additional three are positioned on each arm 128 and function to lock the arm and the corresponding leg 120 attached to it. Connecting arm 128 comprises at each end a non-continuous asymmetric cogwheel 27 configured and operable to allow locking in two positions of tripod 100, when it is fully closed and when it is fully opened, i.e., transition of cogwheel 27 from the first area of the eccentric locking mechanism 24 to the second area of the eccentric locking mechanism 26, while in between them, the tripod is in an unlock state allowing adjustment of the device by the user to a desired position. This process is enabled first by pressing trigger 114 that inserts a pin (not shown) into the central column 110 to release the first locking position and pushing handle 112 up (to close the tripod) or down (to open the tripod). The dimensions in which the locks of each segment are positioned in accordance with the invention is changed compared to prior art tripods, as instead of positioning the locks on the legs themselves as in most tripods available in the market (longitudinal plane), in the present invention the locks are positioned on the connecting arms 128 (transverse plane). This conceptual change allows simultaneous locking of all three/six locking mechanisms 28 and saves the need to lock/unlock each segment in each leg separately as was required in prior art tripods.

In one optional variation of the invention illustrated in FIGS. 3A-3D, the locking of the middle (second) segment 124 and the bottom (third) segment 126 in each of the legs 120 is also performed simultaneously or concurrently in all three legs together with the locking of the upper (first) segment 122 and the middle segment 124. In such variation, middle segment 124 of each leg comprises a gear tooth line 125. The bottom end of gear tooth line 125 comprises a niche 25, whereas bearing sleeve 123' comprises a protruding part 1230' that is configured to fit into niche 25. When locking the upper and middle segments of the leg is performed, gear tooth line 125 on middle segment is pushed downward and clicks into the bottom segment. When closing the tripod, release of the locking of first and second segments 122, 124 pulls gear tooth line 125 upward, thereby unlocking middle and bottom segments 124, 126. Also shown in FIGS. 3D, 3E is a notch 22 that functionally assists in locking bearing 123 to segment 124.

The described locking mechanism may also be applied to lock/unlock a fourth segment in tripods that comprises legs with four segments. Alternatively, locking of the middle segment and the bottom segment (and the third and fourth segments when it exists) may be performed manually, by any one of the locks positioned on the specific leg segments to be locked in a similar manner as in traditional tripods by a friction or clamp action.

In some variations of the invention, when locking of the second and third segments or the third and fourth segments is performed manually, the locking mechanism between the second segment and the third segment and between the third and the fourth may be based on a positive, spring-loaded lock that can retain those segments as either fully open or fully closed. This type of segment is an all-or-nothing opened segment. In such embodiments, the second segment has two openings, an upper opening and a lower opening (not shown), while the third segment comprises a spring-loaded button. When the spring-loaded button protrudes through the lower opening, it positively locks the third segment in its fully extended state. Until the user presses the button in, the relative extensions of the segments cannot move. In its fully retracted state, the button would be protruding from the upper opening instead. The purpose of this positive locking is to remove the possibility of a clamp loosening during operation that may create a real problem to the photographer. Too much pressure and the tubes can be damaging, and with too little pressure the latch is unreliable.

Many tripods have adjustments for this problem, making it one more thing to deal with. The positive locking obviates any need for adjustment. It also can be fast and easy to set to one of two positively locked positions. When the second/third segments comprise additional openings, additional positions of positive lock of the third/forth segments can be provided.

Although the combinations of options for height adjustment are reduced by having a small number of discrete positions of extension of the third and fourth segments, as long as the infinitely adjustable segment is the same length or larger than the smallest all-or-nothing segment, any height between the minimum and maximum is achievable. This scheme reduces by a factor of three the cam locks that need to be relied upon for the tripod's integrity.

Figure 4:
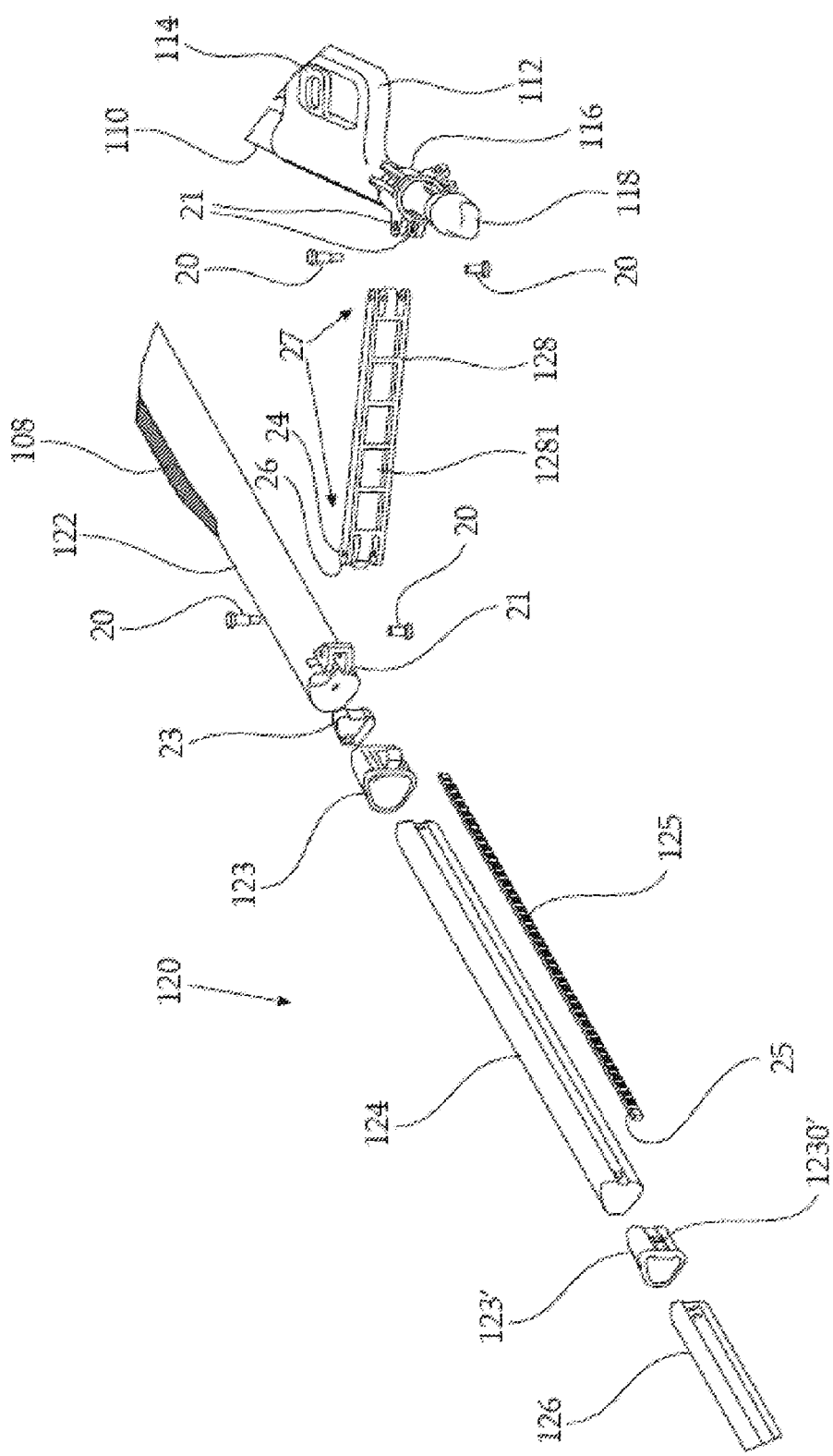
FIG. 4 is an exploded view of one leg of the tripod illustrated in FIG. 1 with its relative connecting arm and the locking elements positioned on the central column.

FIG. 4 is an exploded view of one example of leg 120 of tripod 100 with its corresponding connecting arm 128 comprising cavities 1281, and the non-continuous asymmetric cogwheel 27 that contains two locking points 24 and 26 at each end, and the lower part of central column 110 demonstrating the closing/opening handle 112, trigger 114, central lock 116 comprising three hinge sockets 21, one for each hinge 20 so as to allow connection of the central lock to each of the three arms, and hook 118. Leg 120 contains upper segment 122, middle segment 124 and bottom segment 126. Upper segment comprises an integral gripping area 108 and it is connected to middle segment 124 by hinge 20 positioned within hinge socket 21 via bearing sleeve 123. Optionally, a ring 23 configured to avoid separation of the segments may be added. Also shown in FIG. 4 are the second segment 124, gear tooth line 125 with niche 25 and bearing 123' with protruding area 1230' positioned between the second segment 124 and the third segment 126.

Figure 5E:
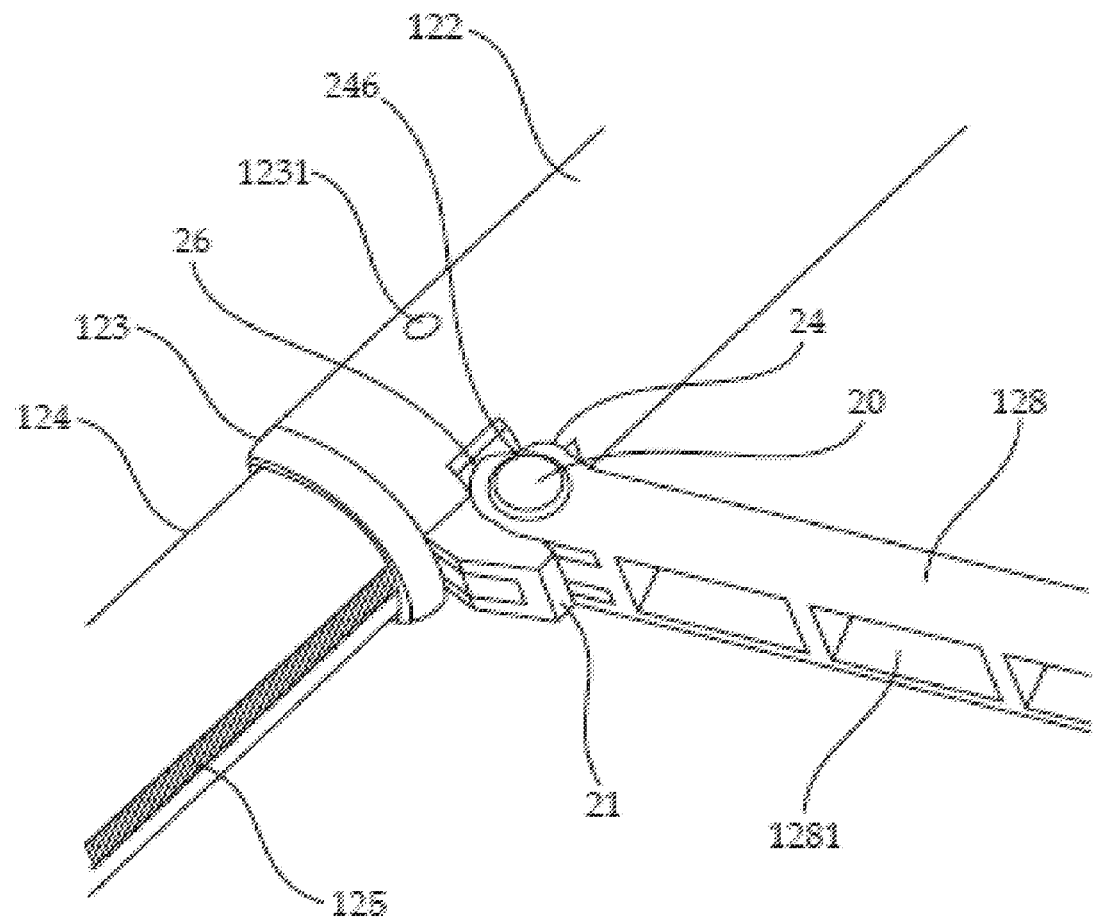

FIGS. 5A-5E are schematic illustrations of tripod 100 in a partially open mode and fully extended legs, wherein FIGS. 5A and 5B are front view and side view illustrations respectively; FIGS. 5C and 5E are close up views demonstrating the connection area between the second and third segments of one leg 120 with the relative connecting arm 128; and the locking mechanism with the two locking areas 24 and 26; and FIG. 5D is a partial cross section view of the tripod legs and the central column with the opening/closing components operating in this area.

In a partially open/close mode of tripod 100, arms 128 are in an angle 15 in the range between 0-90 degrees relative to central column 110 that changes according to the opening/closing level of the tripod. In a close-up view (FIG. 5C, 5E) it is seen that in this position the eccentric lock is in a released position i.e., in a concave area 246 between the two locking points 24 and 26. In a scenario in which the central column is locked with the arm, a similar process is performed at the other end of arm 128 at the connection area with the central column 110 (FIG. 5D). All other components of tripod 100 denoted in FIGS. 5A-5E are the same as described above with reference to FIGS. 1-4.

Figure 6C:
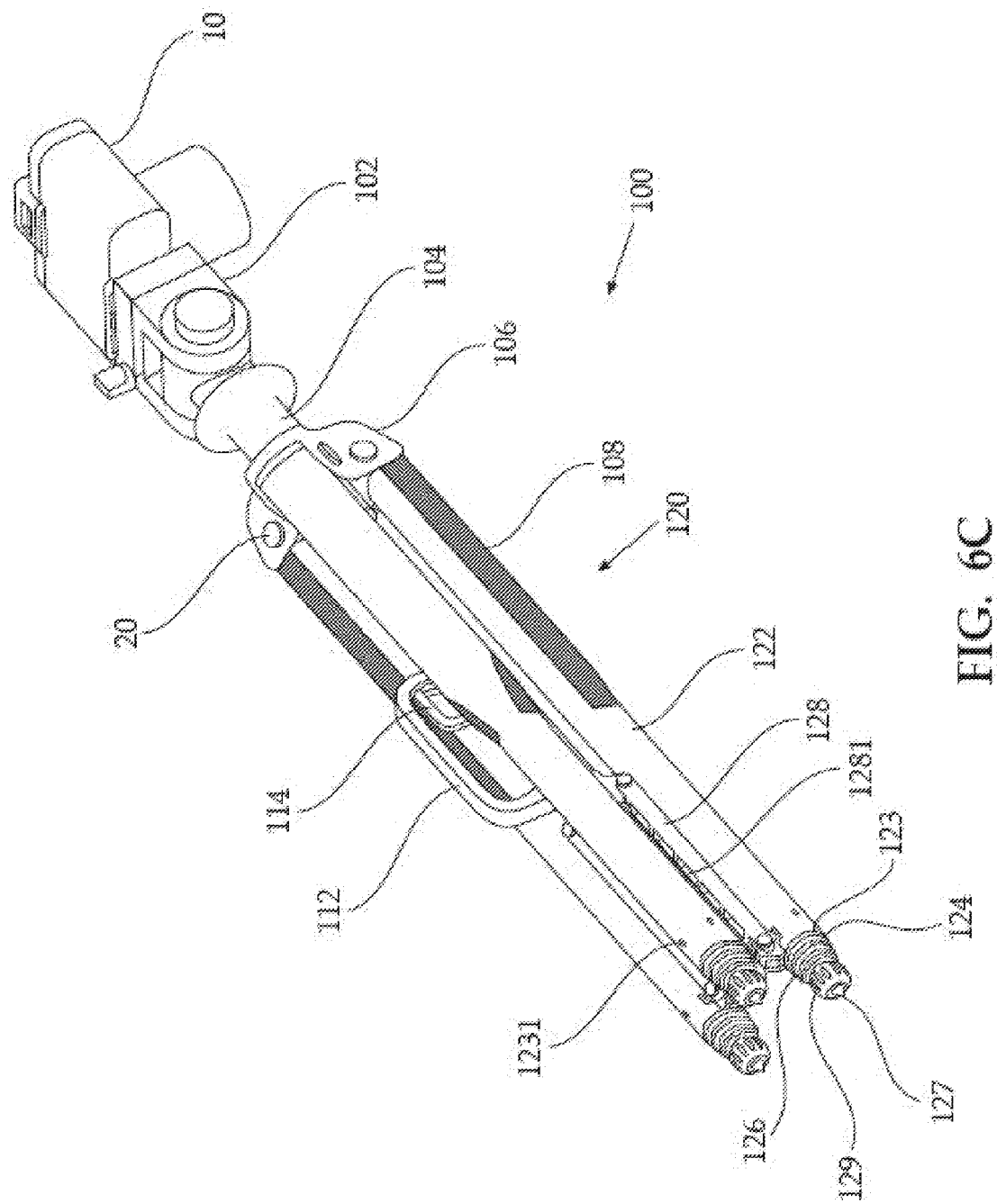

FIGS. 6A-6C are schematic front view, side view and isometric view illustrations (respectively) of tripod 100 of FIG. 1 in a fully closed mode with the legs retracted to their minimal length. Shown in these figures are camera 10, tripod head 102, holding area 104, tripod base 106, hinges 20, first segment 122 of leg 120 with integral gripping handle 108, bearing sleeve 123, lock of bearing sleeve 1231, second segment 124 and third segment 126 retracted within first segment 122, foot 127, cover of foot 129, central column 110, opening/closing handle 112, trigger 114, central lock 116, connecting arms 128 in a folded position (angle of 0 to 10 degrees relative to the legs and to the central column), and cavities of the connecting arms 1281. In a fully closed mode when all legs segments are retracted, the eccentric locking mechanism 28 is fixed at the first locking point 24.

Figure 7:
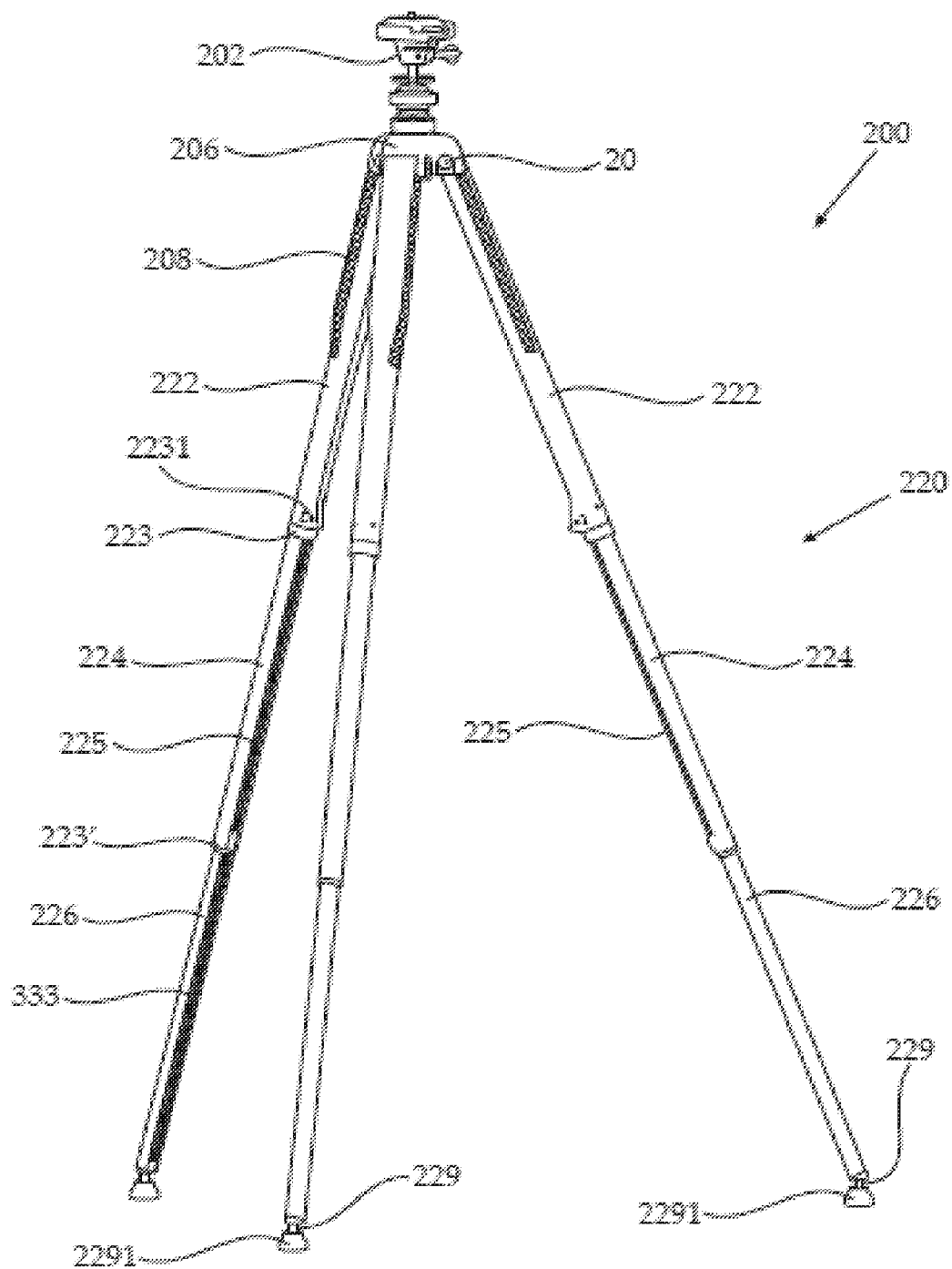
FIG. 7 is a schematic front view illustration of another example of a tripod 200 with a fast opening mechanism in accordance with the present invention, in which the opening angle of the legs determines the lock/unlock status of the legs and the segments of each leg.

FIG. 7 is a schematic front view illustration of one another example of a tripod 200 with a fast opening/closing mechanism in accordance with the invention, in which the locking/unlocking mechanism is positioned within the tripod base area that function as a bearings junction configured to synchronize the opening and closing of the three legs. The opening angle of one leg relative to the tripod base dictates the position of the other legs and also the lock/unlock status of the legs segments. In the example illustrated in this figure, tripod 200 comprises three telescopic legs 220 and has no central column. By changing the angle of any one of legs 220 of tripod 200 relative to the tripod base, the user operates the locking/unlocking mechanism positioned within the tripod base 206 to further lock/release the segments in each of the telescopic legs. Also shown in this figure are: tripod head 202, upper segment 222, middle segment 224 and lower segment 226 of leg 220, leg's foot 229, foot cover 2291, and gripping handle 208.

In accordance with examples of the invention, the locking of the segments of each leg may be obtained by various means such as but not limited to: by enhancing friction forces between structural elements of the tripod, by using geometrical locks, and by a combination of both methodologies. Upon enhancement of the friction force between the segments and the connecting arms, the segments become functionally locked and movement of the segments is reduced to a minimum, if any. In the same manner, when reducing the friction forces between the connecting arms and the legs segments, movement is enabled. In addition to the above, geometric locking mechanisms such as integration of two parallel structures with tooth line or tooth wheel or wedge in a manner that structural components are positioned in the same dimension and the teeth are engaged in each other and thus prevent movement. Another alternative option is to use a pin that is inserted into a dedicated opening, thereby preventing movement of the related structural elements of the tripod.

In the following description, specific examples of the locking mechanisms mentioned above will be described with reference to FIGS. 8-14.

FIGS. 8 to 13 are schematic illustrations of various aspects and views of one another example of a tripod 300 having a fast opening/closing mechanism operated by a handle positioned on a central column. The opening mechanism in this example is semi-automatic and operated by a handle comprising a trigger and connected to a piston attached to a loaded spring. In a closed form of tripod 300, upon pressing on the trigger, a small notch connected to the trigger is released from an opening on the central column profile, and the loaded spring and the piston connected thereto are released and push the handle downward along the central column. Consequently, the telescopic legs automatically open to an angle (relative to the central column) that allows the release (unlocking) and extension of the segments in each of the legs. The user is only required at this stage to press on the trigger and may do that by using a single hand. At this position the tripod legs and segments are unlocked and automatically extend to a desired angle and height. In order to lock the tripod in this open and extended position the user moves the handle downward. The trigger becomes locked in an adjacent opening as the notch connected to the trigger is inserted into a lower opening on the central column. In order to close the tripod from that position, the user presses again on the trigger, gathering the legs toward the central column so as to minimize the opening angle of the legs relative to the central column to an angle that allows insertion of the segments one into the other, and upon reaching that angle, the user may either bend toward the ground to insert each segment to the one above and to bring the tripod to its minimal size, or he/she may turn the tripod in that position upside down and allow the insertion of the segments one into the other by gravitational force. Completion of the locking at that state is obtained by pulling the handle upward and insertion of the notch connected to the trigger into the upmost opening in the central column profile. This manipulation results in loading the spring connected to the piston in a state ready for re-opening of the tripod, and further in locking the tripod in a close retracted form. Common features of tripod 100 illustrated in FIGS. 1-6 and tripod 300 illustrated in FIGS. 8-13 are basically the same, and therefore the detailed explanations provided with reference to tripod 100 also applies for the description of tripod 300 and will therefore not be repeated.

Figure 8C:
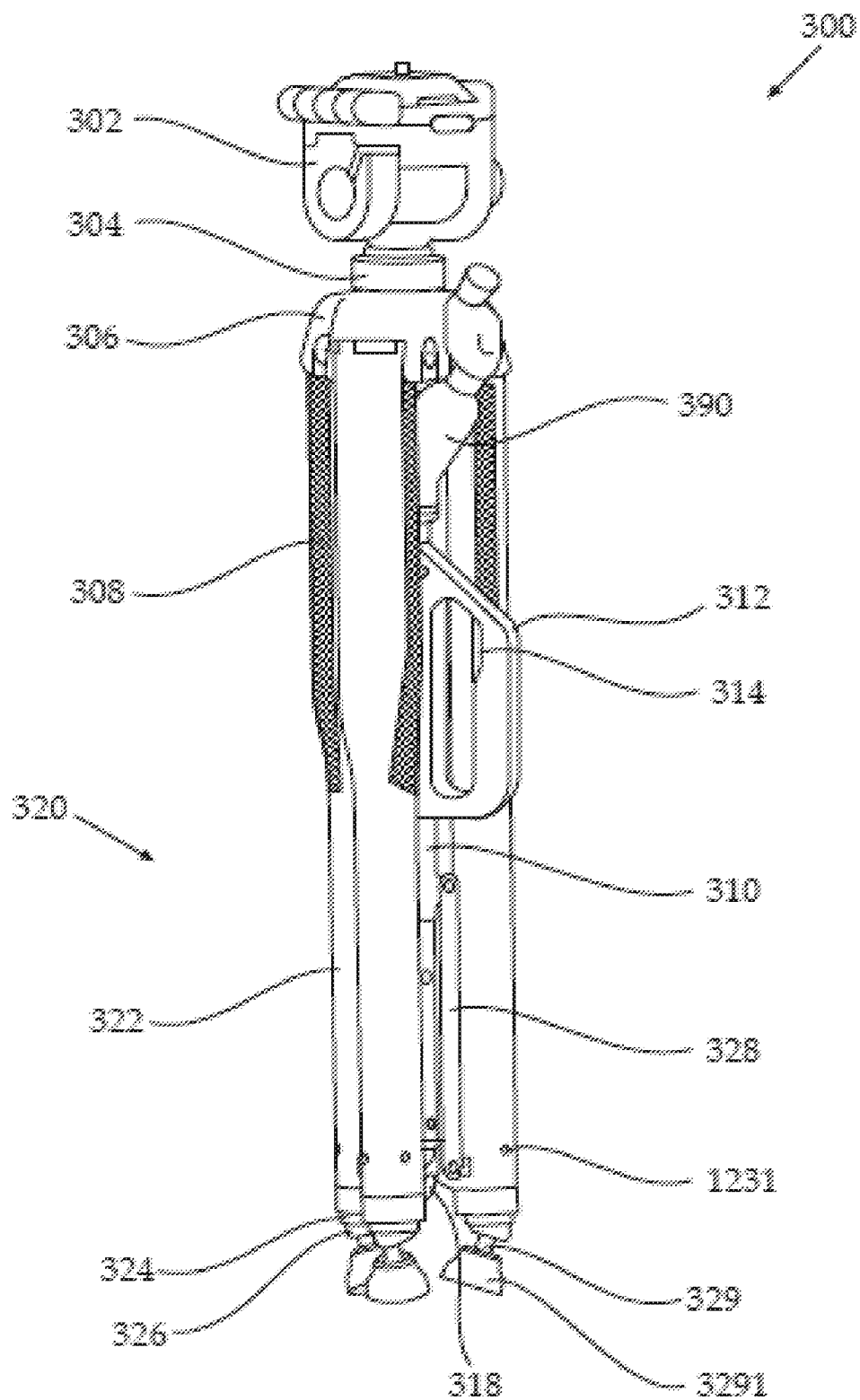
Figure 9C:
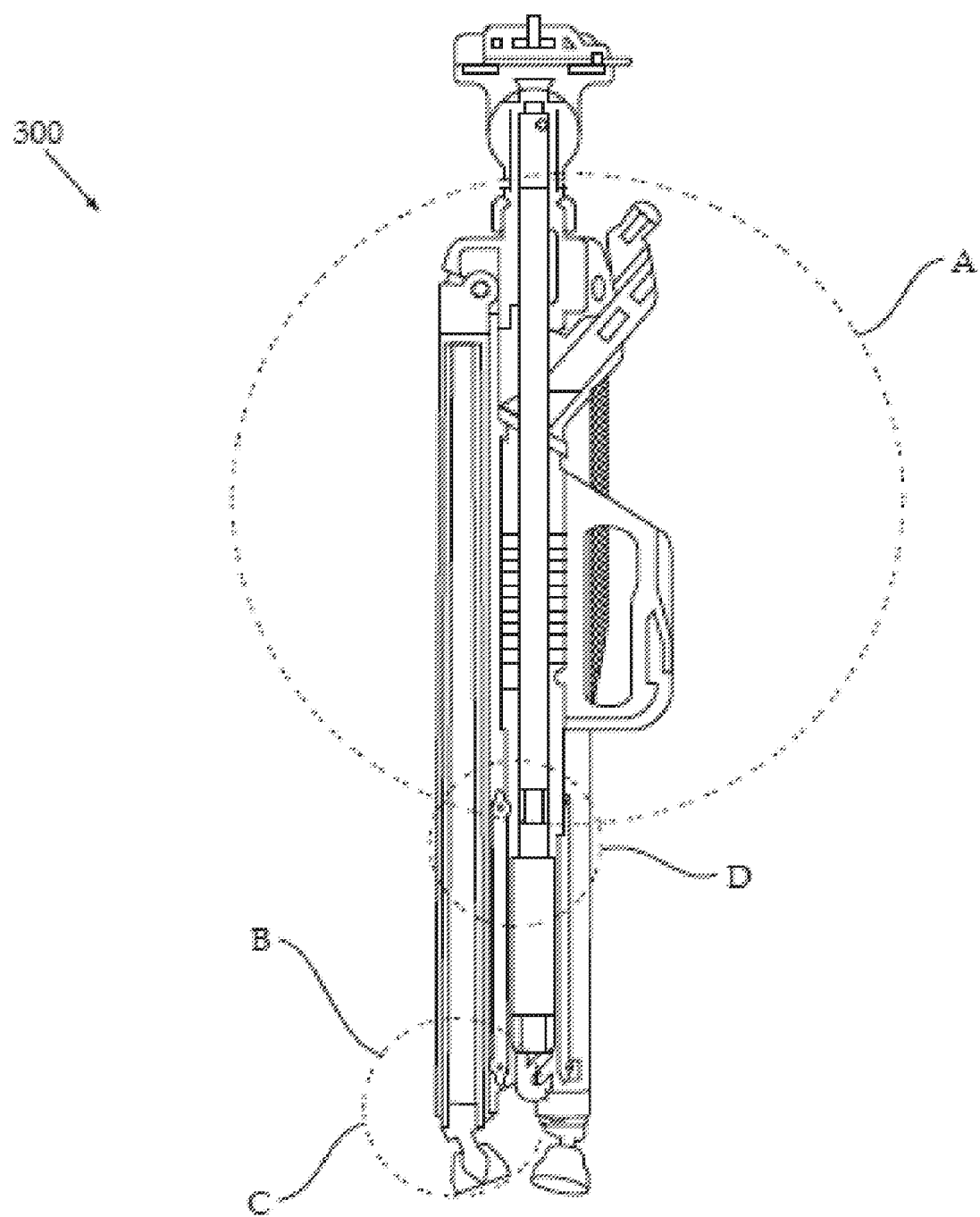

FIGS. 8A-8C and 9A-9C are schematic front view illustrations and cross section view illustrations respectively, of tripod 300 with a fast semi-automatic opening/closing mechanism, having a trigger connected to a piston attached to a loaded spring for automatic opening of the tripod. FIGS. 8A and 9A illustrate tripod 300 in a fully open state with extended legs; FIGS. 8B and 9B illustrate tripod 300 in a partially open mode with partially extended legs; and FIGS. 8C and 9C illustrate tripod 300 in a closed mode with legs diminished to their minimal length. Each cross section view shows four major areas: area "A" describing the locking/unlocking mechanism with the trigger and piston positioned on the central column of tripod 300; area "B" describing the junction area between a connecting arm and the first and second segments of a leg; area "C" describing the connection area between the second and the third segments of the leg; and area "D" describing the junction area between the central column and the connecting arms of tripod 300.

Shown in these figures are: tripod head 302, upper section of central column 304, tripod base 306 connected to each one of the tripod legs 320 via hinges 20, gripping handle 308, central column 310, opening/closing handle 312, trigger 314, central lock 316, hook 318, tripod leg 320 having upper segment 322, middle segment 324, and lower segment 326, connecting arm 328 connected on one end to the upper segment of the leg and to the central column on the other end via bearing sleeve 323 and lock of the bearing 3231, foot 329 and foot cover 3291. Also shown in these figs. is piston 390. Piston 390 is connected to a spring as shown in details with reference to FIGS. 10A-10C.

Figure 10C:
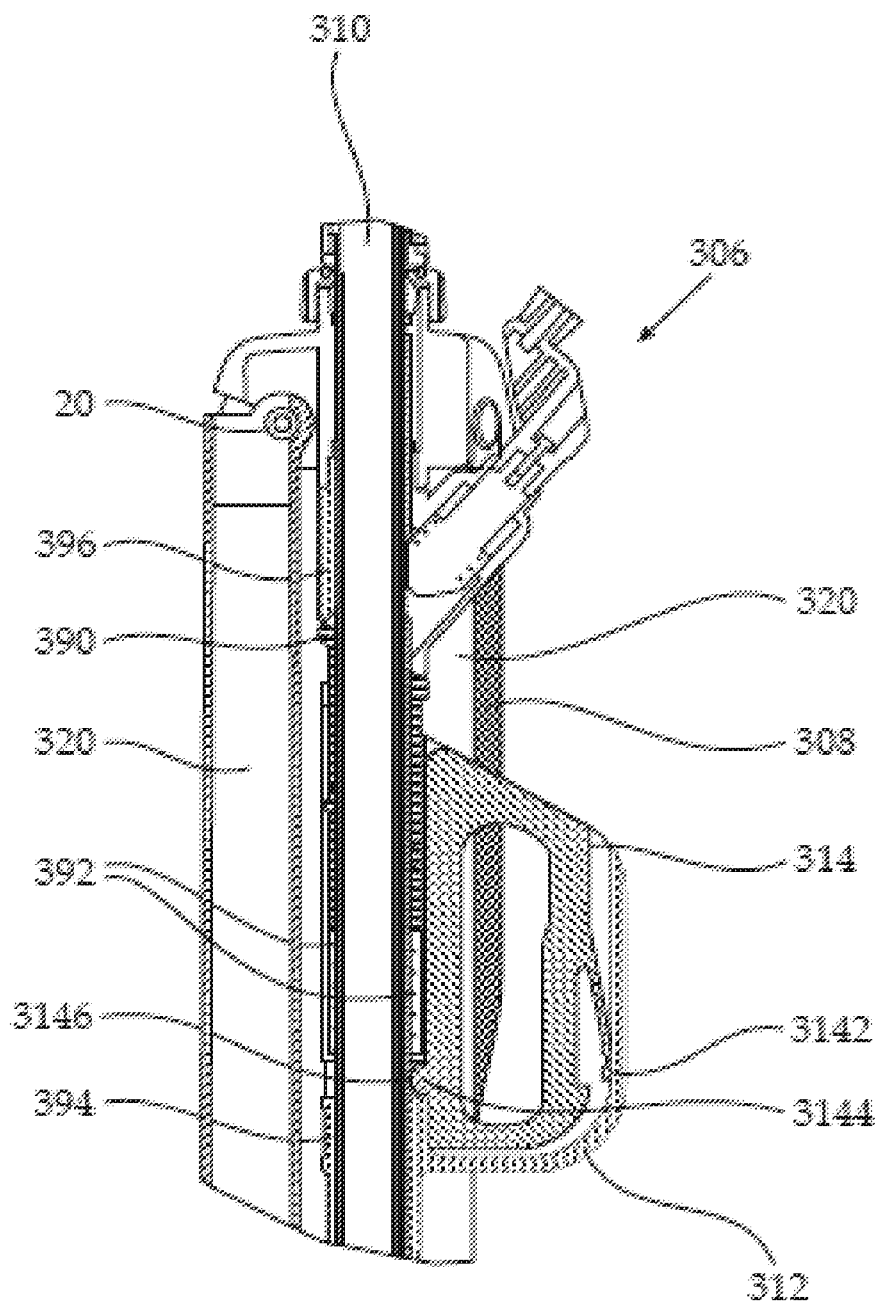

FIGS. 10A-10C are schematic close up, cross section views of area "A" illustrated in FIG. 9 describing the central column of tripod 300 with major components of the semi-automatic opening (locking/unlocking) mechanism in a fully open mode (FIG. 10A), partially open mode (FIG. 10B), and fully close mode (FIG. 10C) respectively.

As mentioned above, when a user (usually a photographer) wishes to open tripod 300 from a close retracted form, he/she should first press on trigger 314 positioned within opening/closing handle 312. Handle 312 is also denoted hereinafter: "opening/closing handle". Trigger 314 is positioned within opening/closing handle 312 and comprises a leaf spring 3142 at the lateral side and a small notch 3144 at the medial side close to the central column. Upon pressing on the trigger the leaf spring is pushed toward the opening handle 312 and consequently, notch 3144 is dragged at the same direction and pulled out from a dedicated opening 3146 existing on the central column 310. Additionally, upon pressing on trigger 314 piston 390 that is connected to a loaded spring 392 in a close folded state is released. Upon release of the loaded spring 392 and the piston 390, the tripod is automatically opened to an angle that functionally unlocks the telescopic leg segments of each one of the legs 320, allowing them to be extended toward the ground. Each leg becomes extended according to the terrain in its vicinity. The movement of piston 390 and spring 392 along the central column is limited at the top side by a stopper 396 and at the bottom side by stopper 394. As shown in the figs. the space between the piston and the stopper 396 at the top side of the tripod changes according to the state of the loaded/unloaded spring and the position of the piston. In an open form, the spring is relaxed, the piston is released and the space between the piston and the upper stopper is maximal, while in a folded extruded form, in which the spring is loaded and the most of the piston is positioned within handle 312, the upper stopper 396 is touching the piston (no space between them). In a partially open position of the tripod, the spring is relaxed, the piston is released, and the distance of the piston from the upper stopper is somewhere in the middle between the two extreme conditions (smaller space).

After the user positions the tripod at a desired height and angle the user may lock the tripod at that position by pulling opening/closing handle 312 downward and release the trigger 314 in front of a dedicated opening 3146 on the central column profile, in order to insert notch 3144 of the trigger into opening 3146 and locked the tripod in that position. In some embodiments of the invention, central column 310 comprises three fixation openings 3146 suitable to notch 3144 configure to allow locking of the tripod in an open position (the utmost lower opening), in a close position (the utmost upper opening), and in the intermediate state (middle opening).

When the user finished photographing and he/she is interested to close the tripod (i.e. to close the legs and retract the legs segments), the user should first press on trigger 314, to release notch 3144 from opening 3146, and to pull the opening/closing handle 312 upwards. This action releases the locking mechanism of the tripod and allows folding of the tripod. Retraction of the segments to each other may be obtained for example by pushing the telescopic legs toward the ground so as to allow insertion of the third segment into the second segment into the first segment in all three legs of the tripod simultaneously. The insertion of the segments one into the other may also be obtained by turning the tripod in a released state upside down and allow gravity forces to insert the third segment into the second segment into the first segment. After the telescopic legs being retracted, the user can lock the tripod in a folded retracted state by pressing on the trigger and releasing the notch 3144 in front of the uppermost opening of the central column to lock the tripod in this form. Spring 392 connected to piston 390 in this close retracted form is reloaded, ready for the next usage (opening) of the tripod. This simple mechanism of opening and closing of the tripod is much faster and convenient relative to prior art tripods and allows the opening of the tripod using one hand only (eliminate the need for holding the tripod's head in the other hand for opening/closing the tripod). Also illustrated in these figs. are tripod base 306, first segment of the tripod leg 322, and gripping handle 308.

Figure 11C:
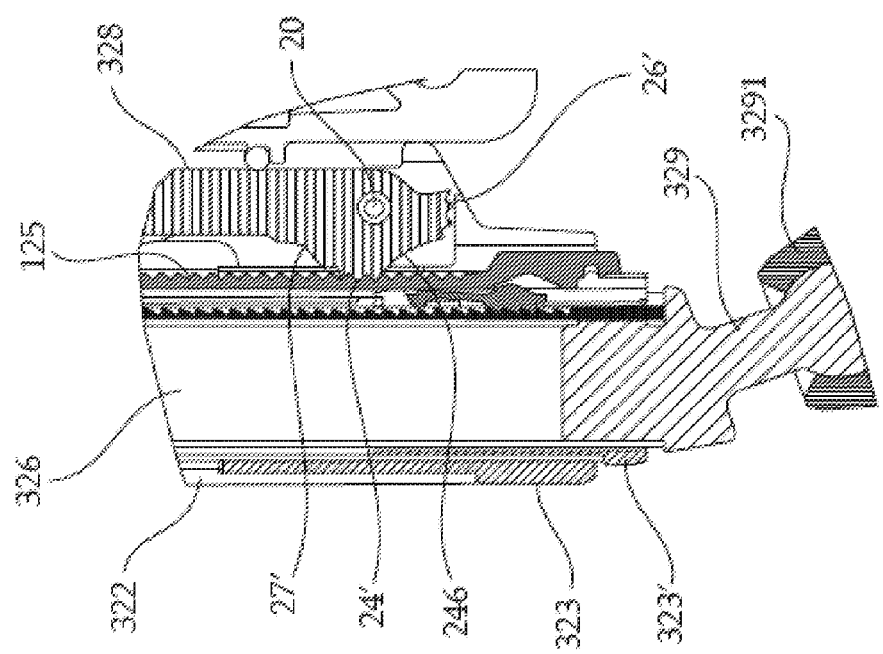

Reference is now made to FIGS. 11 and 14. FIGS. 11A-11C are schematic cross section, close up views of area "B" illustrated in FIG. 9 describing the junction area between a connecting arm 328 and the first segment 322 and second segment 324 of leg 320 of tripod 300 in a fully open mode (FIG. 11A), partially open mode (FIG. 11B), and fully close mode (FIG. 11C) respectively. In the example illustrated in these figs. the locking mechanism in this junction is based on a symmetric cogwheel 27' with two separated teeth segments 24' and 26' providing two locking points in a fully open mode and in a fully closed mode. The two teeth segments are separated by an intermediate concave area 246 between them configured to provide a released area allowing the user ability to transform between a closed mode and an open mode and vice versa. In more details, in the specific example illustrated in these figs., arm 328 is structured as a fork with three arms, each arm comprising on its lateral end a cogwheel 27 that comprises two separated teeth segments configured and operable to allow locking in two positions of tripod 300, when it is fully closed and when it is fully open, i.e., transition of cogwheel 27' from first tooth segment 24' to the second tooth segment 26'. This process is enabled first by pressing trigger 114 that releases notch 3144 from its position in one of the openings on central column 310 and its subsequent insertion into another opening on central column 310 as illustrated with reference to FIG. 10 in order to release the tripod from a first locking position and allow it to be locked in a second locking position. The transition from one locking position to the other is further achieved by pushing the opening/closing handle 312 either up (to close the tripod) or down (to open the tripod).

In an open form of tripod 300 (FIG. 11A), the second tooth segment 26' is integrated with tooth line 125 of second segment 324. The integrated tooth causes movement of the entire tooth line 125 upward that results in the locking of the second and the third segments 324 and 326 of leg 320. Also shown in these figs. are bearing sleeves 323 and 323'.

Figure 14A:
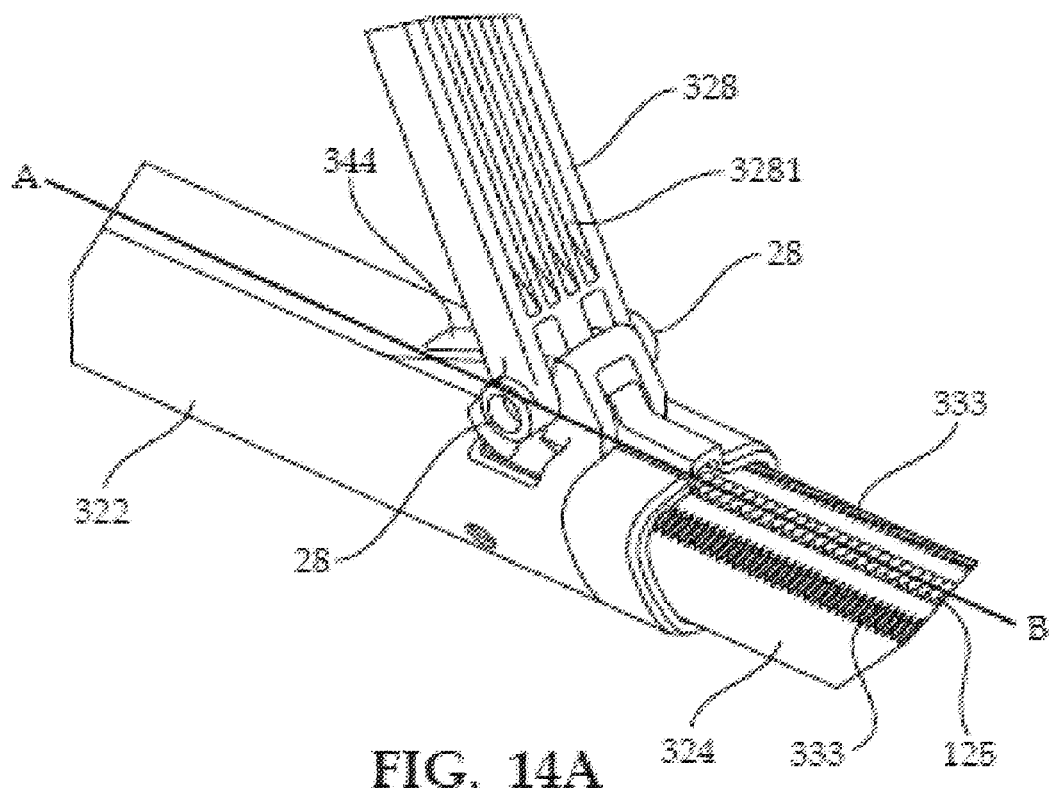
Figure 14B:
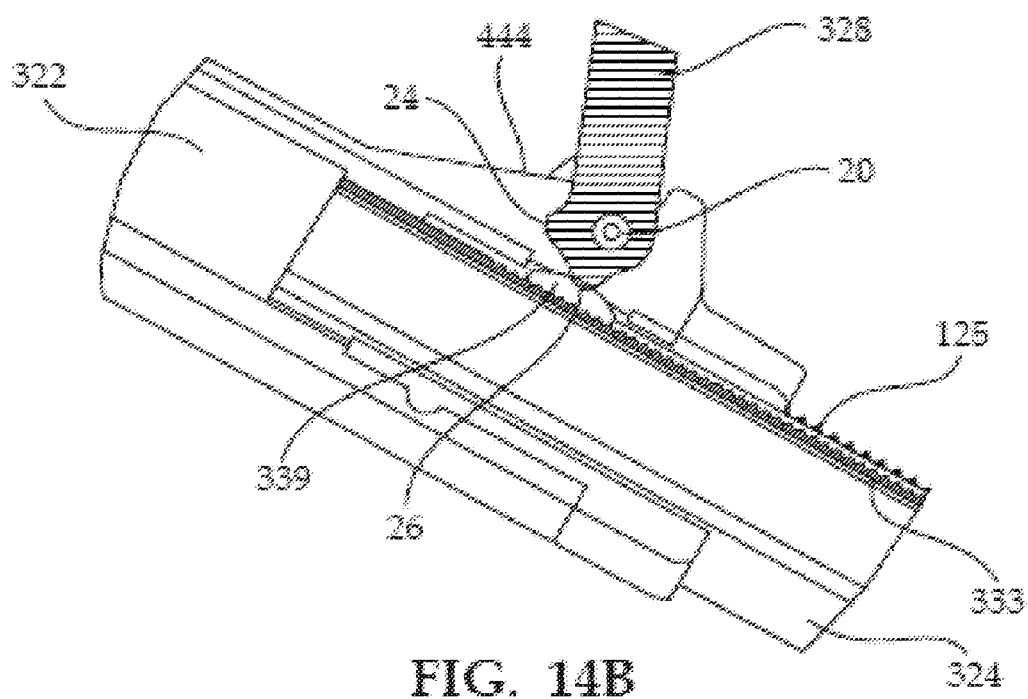

FIGS. 14A-14B are schematic isometric view and cross section view along axis AB respectively, of the junction area between the connecting arm and the first and second segments of the tripod legs having a double fixed tooth line structure and a break pad configuration, to provide enhanced stability to the tripod of the invention in an open extended position. FIG. 14A is an isometric view; and FIG. 14B is a cross section view along AB axis illustrated in FIG. 14A. In the specific embodiment illustrated in these figs., the second segment of the leg further comprises at least one solid tooth line 333 that is slotted on the leg's profile. Upon integration of the eccentric locking area with the tooth line it further presses on a break pad 339 having a serrated bottom and locks it to solid tooth line 333, so as to lock first leg segment 322 to second leg segment 324. In the intermediate state (FIG. 11B), concave arc 246 is parallel to tooth line 125 and to solid tooth line/s 333 and thus, the locking mechanism 28 is in a released state and movement of segments and of opening/closing handle 312 is possible. In s close form of tripod 300 (FIG. 11C), the first locking area 24 is integrated with tooth line 125 of second segment 324. The integrated tooth causes movement of the entire tooth line downward that results in locking of the second and the third segments 324 and 326 of leg 320 once again in a close state of the tripod. In this position, when second segment further comprises solid tooth lines 333 the break pad 339 is pressed down again and the bottom serrated side of the pad becomes integrated with the solid tooth line 333 to lock the tripod and prevent movement of the legs in such state.

Figure 12A:
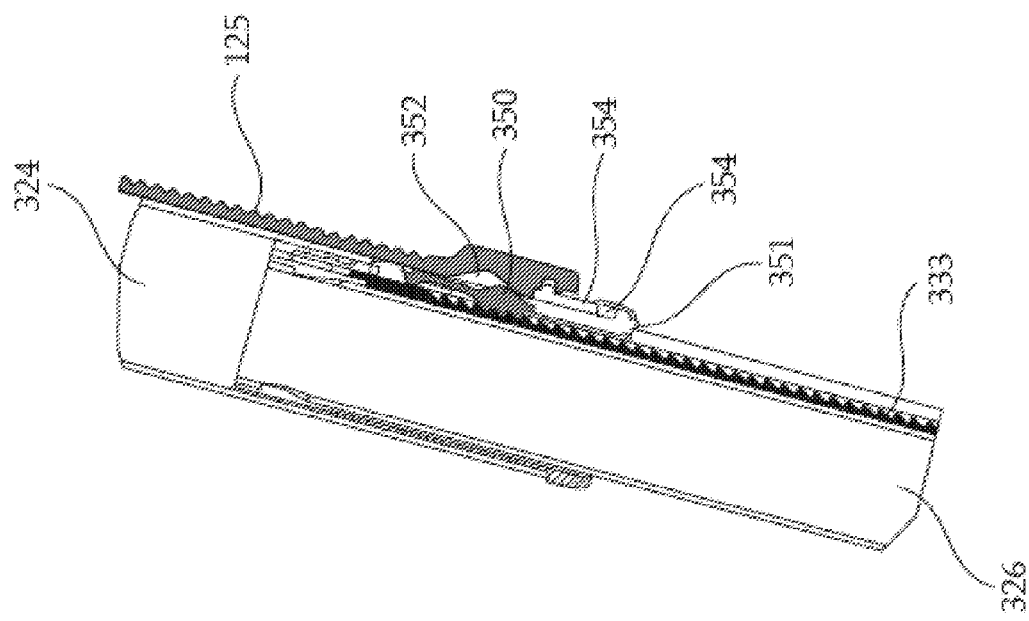

FIG. 12A-12C are schematic close up cross section views of area "C" illustrated in FIG. 9 describing the connection area between second segment 324 and third segment 326 of leg 320 of tripod 300 in a fully open mode (FIG. 12A), partially open mode (FIG. 12B), and fully closed mode (FIG. 12C) respectively. In a locked state (open tripod) a wedge 350 is integrated with a solid unidirectional tooth line 333. A leaf spring 351 is in a constant tensed state aiming to push wedge 350 upward, and a supporting structure 355 configured to support gear tooth line 125 to return to a basic neutral position. In such configuration, there is a space 354 between leaf spring 351 and supporting structure 355. Another space having a triangular shape 352 is also shown above wedge 350. In the intermediate state (FIG. 12B), gear tooth line 125 moves, and the tensed leaf spring 351 becomes further loaded as a result of the wedge movement 350 and pushes wedge 350 into space 352, thus, wedge 350 is elevated and becomes receded from tooth line 333 of third segment 326, space 354 is closed and movement of the segments is enabled. Upon closing and locking the tripod, cogwheel 27 of connecting arm 328 becomes integrated with gear tooth line 125 of the second segment; the bottom side of wedge 350 becomes integrated with tooth line 333 of third segment, leaf spring 351 is released and does not touch (push) wedge 350, thus, space 352 above the wedge is shown, and movement of the segments is disabled.

Figure 13A:
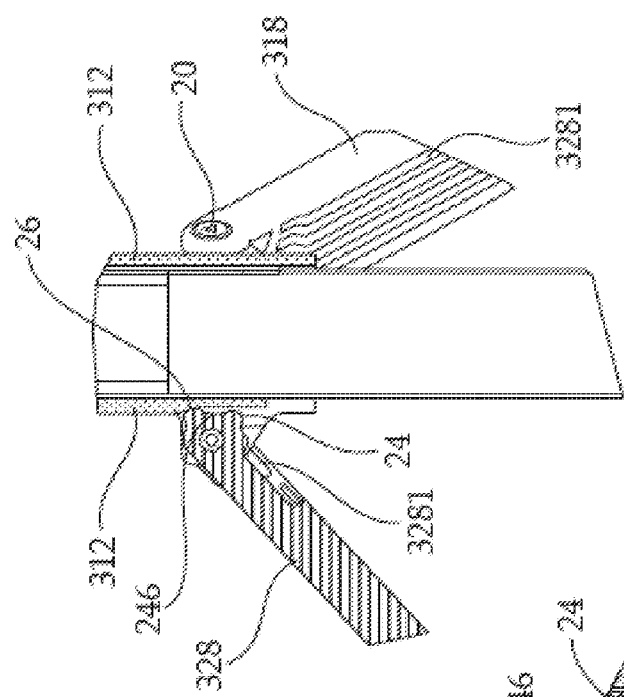
FIG. 13A-13C are schematic close up views of area "D" illustrated in FIG. 9 describing the junction area between the central column 310 and the connecting arms 328 with major components of the locking/unlocking mechanism, in a fully open mode (FIG. 13A), partially open mode (FIG. 13B), and fully closed mode (FIG. 13C) respectively.
Figure 13B:
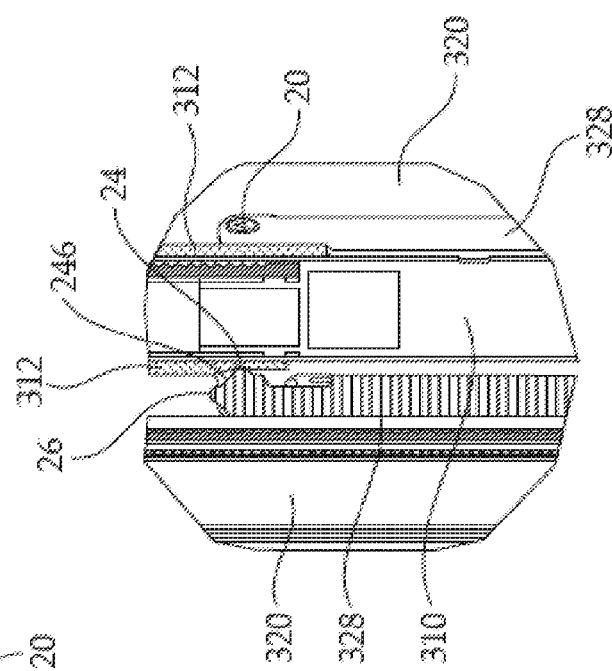
Figure 13C:
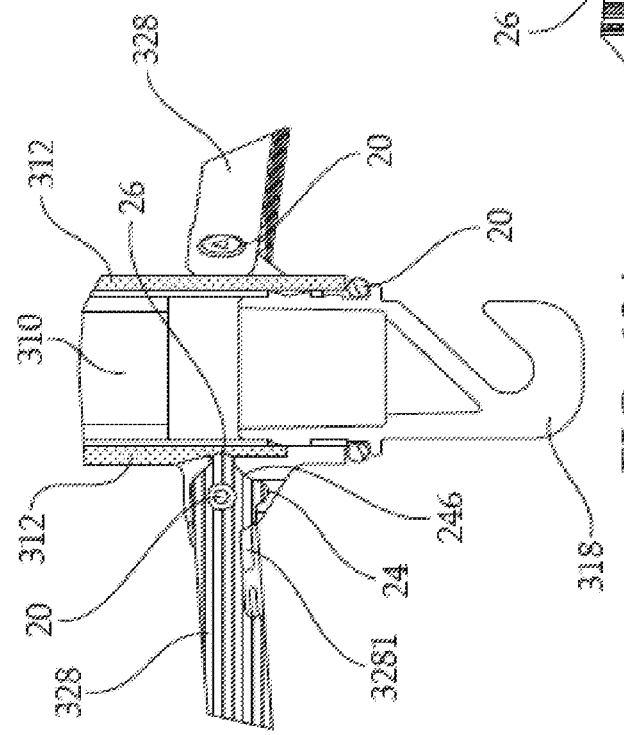

FIG. 13A-13C are schematic cross section close up views of area "D" illustrated in FIG. 9 describing the junction area between the central column 310 and the connecting arms 328 in a fully open mode (FIG. 13A), partially open mode (FIG. 13B), and fully closed mode (FIG. 13C) respectively. As illustrated in these figures a similar locking mechanism 28 that is used for locking the connecting arms and the legs is used for locking and unlocking the connecting arms 328 to the central column 310. When the tripod is in a fully open state (FIG. 13A) upper locking point 26 presses on both the central column 310 and the opening/closing handle 312. The pressure functionally creates locking and prevents movement of the part in this area. A similar situation occurs in a close retracted state of the tripod (FIG. 13C), when the lower locking point 24 is pressed on the central column and locks it as a result of the pressure applied on the central column at that point. In the intermediate state (tripod is unlocked) shown in FIG. 13B, the central column faces the concaved area 246 between the two locking points. In that position of the connecting arm 328 relative to the central column, no pressure is applied on the central column and the opening/closing handle 312 and movement is enabled. Also shown in these figs are hinges 20, hook 318, leg 320, and cavities 3281 in connecting arms 328 for reducing the total weight of the tripod.

It should be clear that the description of the embodiments and attached Figures set forth in this specification serves only for a better understanding of the invention, without limiting its scope. It should also be clear that a person skilled in the art, after reading the present specification could make adjustments or amendments to the attached Figures and above described embodiments that would still be covered by the present invention.

The invention claimed is:

1. A tripod allowing a user to open said tripod in a photographing location while maintaining eye contact with an object to be photographed, said tripod comprising:
   two or more tripod legs, said legs having one or more telescopic segments; and
   a central locking mechanism, said central locking mechanism being operated by at least one handle said handle having at least one trigger connected to at least one loaded spring, said spring positioned on a central column,
   wherein upon pressing on said trigger said central locking mechanism is unlocked to allow spacing of said tripod legs and free fall of said telescopic segments of each one of said legs towards the ground according to the height of the ground in the vicinity of each of said legs, and
   wherein upon sliding of said handle downward along said central column, said legs with said extended segments become locked in an open form.

2. A tripod according to claim 1, wherein:
   a. Said legs comprise at least two telescopic segments configured to be extracted and retracted upon opening and closing of said tripod so as to allow adjustment of said tripod's height according to an object to be photographed;
   b. Said central column is connected to each of said tripod legs via a corresponding connecting arm, wherein each connecting arm is configured to allow locking of said tripod in an open and close form as part of said central locking and unlocking mechanism; and c. Said central locking and unlocking mechanism is configured to allow said user to transform the tripod to any one of the following forms: tripod locked with close legs and fully retracted telescopic segments; tripod locked with close legs and partially retracted telescopic segments; tripod unlocked with partially open legs and partially extracted telescopic segments; tripod locked with fully open legs and partially extracted telescopic legs; and tripod locked with a fully open legs and fully extracted telescopic legs.

3. A tripod according to claim 1, wherein the angle and height of the legs of said tripod are determined by said handle positioned on said central column, and wherein the position of said handle along said central column functionally determines whether said tripod legs and said central locking mechanism are in a locked or unlocked state.

4. A tripod allowing a user to transform said tripod from a close folded form to an open extracted form and vice versa and further to lock said tripod in a desired height and angle in a photographing location, said tripod comprising:
   a. legs having at least two telescopic segments configured to be extracted and retracted upon opening and closing of said tripod so as to allow adjustment of said tripod's height according to an object to be photographed;
   b. a central column connected to each of said tripod legs via a corresponding connecting arm, wherein each connecting arm is configured to allow locking of said tripod in an open and close form as part of a central locking and unlocking mechanism; and
   c. a central locking and unlocking mechanism configured to allow said user to transform said tripod to any one of the following forms: tripod locked with close legs and fully retracted telescopic segments; tripod locked with close legs and partially retracted telescopic segments; tripod unlocked with partially open legs and partially extracted telescopic segments; tripod locked with fully open legs and partially extracted telescopic legs; and tripod locked with a fully open legs and fully extracted telescopic legs.

5. A tripod according to claim 4, wherein the angle and height of the legs of said tripod are determined by a handle positioned on said central column, and wherein the position of said handle along said central column functionally determines whether said tripod legs and said central locking mechanism are in a locked or unlocked state.

6. A tripod according to claim 4, wherein the positioning of said tripod is adjusted by pressing a trigger positioned on said handle so as to unlock the tripod and to permit moving of the handle back and forth along the central column and to relock the tripod at a desired form.

7. A tripod according to claim 4, wherein said fast opening/closing mechanism is configured and operable to be actuated by a handle comprising a trigger and connected to a piston attached to a loaded spring.

8. A tripod according to claim 7, wherein in a close form of tripod, upon pressing on said trigger, a notch connected to said trigger is released from an opening on said central column, and said loaded spring and piston connected thereto are released, thereby pushing said handle downward along said central column, so as to permit automatic opening of said legs to an angle relative to said central column that allows for unlocking and extension of said leg segments, and wherein, locking said tripod in the open extended form is accomplished by sliding said handle downward and pressing said trigger in order to lock said notch connected to said trigger in a lower opening on said central column.

9. A tripod according to claim 7, wherein in an open form of said tripod, upon pressing on said trigger, said notch connected to said trigger is released from said opening on said central column so as to permit gathering of said legs toward said central column, thereby minimizing the opening angle of said legs relative to said central column to an angle that allows insertion of said leg segments one into the other, and upon reaching said angle said leg segments are functionally inserted one into the other so as to permit minimizing the size of said tripod and locking said tripod in a close retracted form.

10. A tripod according to claim 9, wherein insertion of the segments one into the other is accomplished by one of the following methods: (i) by pressing said segments toward the ground; (ii) by turning said tripod upside down for using gravity force for insertion of said segments one into the other; and wherein, completion of locking is accomplished by pulling said handle upward and insertion of said notch connected to said trigger into the uppermost opening in said central column, so as to allow loading of said spring connected to said piston in a state ready for re-opening of said tripod.

11. A tripod comprising:
two or more telescopic legs having at least two segments; and
a central locking and unlocking mechanism,
wherein said central locking and unlocking mechanism is configured to allow unlocking and opening of said tripod in a fast process that releases all of said tripod legs from a closed form in which said legs are parallel or almost parallel to each other to an open form, in which said legs are deployed in an angle between 15-60 degrees relative to their position in a closed form, and wherein upon opening of said telescopic legs, said segments of each leg are automatically extracted and locked in a desired height from the ground according to a specific surface height in the vicinity of each leg of said tripod.

12. A tripod according to claim 11, wherein said locking and unlocking mechanism is configured to allow locking and unlocking of said tripod telescopic legs and segments of each of said legs according to the angle of said tripod legs, in a manner such that said tripod is transformed from a locked state in an open and in a closed position of said legs to an unlocked state in a partially open position of said legs.

13. A tripod according to claim 11, wherein said central locking and unlocking mechanism is configured to allow closing and folding of said tripod from an open extracted form to a closed retracted form by performance of two steps:
(i) unlocking said central locking mechanism; and
(ii) pressing said legs toward the ground so as to insert said segments of each leg into one another or by turning said tripod in an unlocked state upside down so as to allow insertion of the telescopic segment to each other by gravity force.

14. A tripod according to claim 13, wherein upon closing of said legs and retraction of said segments of each leg, a spring is tensed so as to allow reopening of said legs for the next use.

15. A tripod according to claim 11, wherein said central locking and unlocking mechanism is positioned within the tripod base.

16. A tripod according to claim 11, further comprising a central column connected to said tripod legs via connecting arms wherein said central locking and unlocking mechanism is configured to be operated by a handle positioned on said central column, and wherein the positioning of said handle along said central column functionally determines whether said central locking mechanism is in a locked or unlocked state.

17. A tripod according to claim 16, wherein said handle comprises a trigger that is configured to release said handle from a fixed location on said central column and to allow movement of said handle toward another location on said central column so as to be relocked.

18. A tripod according to claim 17, wherein said location on the central column is an opening configured to allow insertion and extraction of a notch connected to said trigger in a manner such that insertion of said notch into said opening permits locking of said tripod and extraction of said notch from said opening permits unlocking of said tripod and free sliding of said handle along said central column.

19. A tripod according to claim 18, wherein in a state that said central locking mechanism is locked, said tripod is either in a fully open or in a fully closed form, and wherein in a state that said central locking mechanism is unlocked, said tripod is in a partially open form, and said trigger is configured to allow transformation from a locked to unlocked state.

* * * * *